(12) United States Patent
Horn et al.

(10) Patent No.: US 8,885,536 B2
(45) Date of Patent: Nov. 11, 2014

(54) METHOD AND APPARATUS FOR MANAGING LOCAL INTERNET PROTOCOL OFFLOAD

(75) Inventors: Gavin Bernard Horn, La Jolla, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 13/080,479

(22) Filed: Apr. 5, 2011

(65) Prior Publication Data

US 2012/0082090 A1    Apr. 5, 2012

Related U.S. Application Data

(60) Provisional application No. 61/323,777, filed on Apr. 13, 2010, provisional application No. 61/371,135, filed on Aug. 5, 2010.

(51) Int. Cl.
| | | |
|---|---|---|
| *H04H 20/71* | (2008.01) | |
| *H04W 76/02* | (2009.01) | |
| *H04W 8/08* | (2009.01) | |

(52) U.S. Cl.
CPC .............. *H04W 76/02* (2013.01); *H04W 8/082* (2013.01)
USPC ........................................................ 370/312

(58) Field of Classification Search
CPC ....................... H04L 63/0485; H04L 29/12735
See application file for complete search history.

(56) References Cited

U.S. PATENT DOCUMENTS

| | | | |
|---|---|---|---|
| 2009/0270096 A1 | 10/2009 | Somasundaram et al. | |
| 2011/0170469 A1* | 7/2011 | Watfa et al. | 370/312 |
| 2011/0170517 A1* | 7/2011 | Bakker et al. | 370/331 |
| 2012/0218974 A1* | 8/2012 | Zhou et al. | 370/331 |

FOREIGN PATENT DOCUMENTS

| | | |
|---|---|---|
| GB | 2428942 A | 2/2007 |
| JP | 2006121180 A | 5/2006 |
| JP | 2009253431 A | 10/2009 |
| JP | 2009271842 A | 11/2009 |
| WO | WO2008125729 A1 | 10/2008 |
| WO | 2009116409 A1 | 9/2009 |
| WO | 2009132435 A1 | 11/2009 |
| WO | WO2010039085 A1 | 4/2010 |

OTHER PUBLICATIONS

Alcatel-Lucent et al., "Restructuration of TR 23.829", 3GPP Draft; S2-101719 Was 1449_23829 Restructuring_R0, 3rd Generation Partnership Project (3GPP), Mobile Competence Centre; 650, Route Des Lucioles; F-06921 Sophia-Antipolis Cedex; France, vol. SA WG2, No. San Francisco, USA; 20100222, Feb. 25, 2010, XP050434102, [retrieved on Feb. 25, 2010].

(Continued)

*Primary Examiner* — Raj Jain
(74) *Attorney, Agent, or Firm* — François A. Pelaez

(57) ABSTRACT

Methods and apparatuses are provided that facilitate establishing packet data context for local internet protocol (IP) offload at a device. One or more indicators regarding local IP offload access or support can be evaluated to determine whether to establish a requested context for the device. Where the one or more indicators allow, a packet data context for local IP offload traffic can be established and associated with a radio bearer at an access point allowing the device to communicate local IP offload data over the radio bearer.

40 Claims, 21 Drawing Sheets

(56) References Cited

OTHER PUBLICATIONS

International Search Report and Written Opinion—PCT/US2011/032148—ISA/EPO—Nov. 10, 2011.

Vodafone: "Introduction of local breakout from HNB for Gn/Gp SGSN", 3GPP Draft; S2-094053, 3rd Generation Partnership Project (3GPP), Mobile Competence Centre; 650, Route Des Luci0les; F-06921 S0phia-Antip0lis Cedex; France, No. Tallinn; 20090515, May 15, 2009, XP050347034 [retrieved on May 15, 2009].

* cited by examiner

METHOD AND APPARATUS FOR MANAGING LOCAL INTERNET PROTOCOL OFFLOAD

CLAIM OF PRIORITY UNDER 35 U.S.C. §119

The present Application for Patent claims priority to Provisional Application No. 61/323,777 entitled "SESSION MANAGEMENT PROCEDURES FOR MANAGING LOCAL IP ACCESS" filed Apr. 13, 2010, and assigned to the assignee hereof and hereby expressly incorporated by reference herein, as well as Provisional Application No. 61/371,135 entitled "COEXISTENCE OF CORPORATE VPN ACCESS AND LOCAL IP ACCESS" filed Aug. 5, 2010, and assigned to the assignee hereof and hereby expressly incorporated by reference herein.

BACKGROUND

1. Field

The following description relates generally to wireless network communications, and more particularly to managing local internet protocol access.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, wireless relay stations and low power base stations (e.g., which can be commonly referred to as Home NodeBs or Home eNBs, collectively referred to as H(e)NB, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs provide closed subscriber group (CSG) access that restricts access to certain devices or related users that are members of the CSG. A home subscriber server (HSS), home location register (HLR), or one or more other nodes of a device's home network can store CSG subscription data for the device, which can include one or more lists of CSGs of which the device is a member.

In addition, by virtue of the broadband connection utilized by H(e)NBs, H(e)NBs can additionally acquire access to services or access to resources over a local network. In an example, where an H(e)NB utilizes (or provides) a gateway or router that can allow other devices to access the Internet, the devices and the H(e)NB can participate in a local internet protocol (IP) network that is served by the gateway or router, and can thus provide services or access to resources over the local IP network, such as storage devices, printers or other output devices, etc. In addition, the H(e)NB, in some examples, can provide local IP access (LIPA) to one or more mobile devices communicating with the H(e)NB over a mobile network interface such that the one or more mobile devices can access local resources on the IP network as well (e.g., and/or devices on the local network can access resources of the one or more mobile devices). In another example, an H(e)NB can implement selected IP traffic offload (SIPTO) for filtering traffic related to one or more devices over the Internet using the router without forwarding the traffic through the mobile network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with managing local internet protocol (IP) offload functionality, such as local IP access (LIPA), selected IP traffic offload (SIPTO), etc., in a wireless network. For example, one or more indicators or permissions related to local IP offload can be verified as part of determining whether to initialize local IP offload for a given device. The indicators or permissions, for example, can correspond to whether the device is allowed to utilize local IP offload, whether a device request for a packet data context relates to local IP offload, whether a corresponding home Node B or home evolved Node B (H(e)NB) or other access point supports local IP offload, whether the device is allowed to utilize local IP offload at the H(e)NB (e.g., or with a related closed subscriber group or other association), whether the device is allowed to utilize local IP offload for a specified access point name (APN), whether local IP offload is supported at the H(e)NB for the APN, and/or the like. In one example, an H(e)NB can provide an indicator that specifies whether the H(e)NB supports local IP offload. For example, this indicator can include an address of a gateway with which to establish a context for the device to enable local IP offload. In addition, for example, a context established for local IP offload can be deactivated based at least in part on one or more parameters related to the device to allow for continuing local IP offload among associated H(e)NBs.

According to an example, a method for providing local IP offload in wireless communications is provided that includes receiving a request to establish a packet data context for a device at an access point and determining that the packet data context corresponds to a local IP offload. The method further includes determining whether the access point supports the local IP offload based at least in part on a local IP offload indicator and selecting a gateway for establishing the packet data context based at least in part on the determining that the packet data context corresponds to the local IP offload and the local IP offload indicator.

In another aspect, an apparatus for providing local IP offload in wireless communications is provided that includes at least one processor configured to obtain a request to establish a packet data context for a device at an access point and determine that the packet data context corresponds to a local IP offload. The at least one processor is further configured to determine whether the access point supports the local IP offload based at least in part on a local IP offload indicator and select a gateway for establishing the packet data context based at least in part on the packet data context corresponding to the local IP offload and the local IP offload indicator. In addition, the apparatus includes a memory coupled to the at least one processor.

In yet another aspect, an apparatus for providing local IP offload in wireless communications is provided that includes means for receiving a request to establish a packet data context for a device at an access point and means for determining that the packet data context corresponds to a local IP offload and discerning whether the access point supports the local IP offload based at least in part on a local IP offload indicator. The apparatus further includes means for selecting a gateway for establishing the packet data context based at least in part on the packet data context corresponding to the local IP offload and the local IP offload indicator.

Still, in another aspect, a computer-program product for providing local IP offload in wireless communications is provided including a computer-readable medium having code for causing at least one computer to obtain a request to establish a packet data context for a device at an access point and code for causing the at least one computer to determine that the packet data context corresponds to a local IP offload. The computer-readable medium further includes code for causing the at least one computer to discern whether the access point supports the local IP offload based at least in part on a local IP offload indicator and code for causing the at least one computer to select a gateway for establishing the packet data context based at least in part on the packet data context corresponding to the local IP offload and the local IP offload indicator.

Moreover, in an aspect, an apparatus for providing local IP offload in wireless communications is provided that includes a context establishing component for receiving a request to establish a packet data context for a device at an access point and a local IP offload support determining component for determining that the packet data context corresponds to a local IP offload and discerning whether the access point supports the local IP offload based at least in part on a local IP offload indicator. The apparatus further includes a gateway selecting component for selecting a gateway for establishing the packet data context based at least in part on the packet data context corresponding to the local IP offload and the local IP offload indicator.

According to another example, a method for deactivating a packet data context for a local IP offload is provided that includes receiving a registration request from a device at a first access point. The method further includes determining that the device has a packet data context with a second access point for communicating local IP offload and deactivating the packet data context based at least in part on one or more parameters of the second access point.

In another aspect, an apparatus for deactivating a packet data context for local internet protocol (IP) offload is provided that includes at least one processor configured to receive a registration request from a device at a first access point and determine that the device uses a packet data context with a second access point for communicating using a local IP offload. The at least one processor is further configured to deactivate the packet data context based at least in part on one or more parameters of the second access point. In addition, the apparatus includes a memory coupled to the at least one processor.

In yet another aspect, an apparatus for deactivating a packet data context for local IP offload is provided that includes means for receiving a registration request from a device at a first access point and means for determining that the device has a packet data context with a second access point for communicating using a local IP offload. The apparatus further includes means for deactivating the packet data context based at least in part on one or more parameters of the second access point.

Still, in another aspect, a computer-program product for deactivating a packet data context for local IP offload is provided including a computer-readable medium having code for causing at least one computer to receive a registration request from a device at a first access point and code for causing the at least one computer to determine that the device uses a packet data context with a second access point for communicating using a local IP offload. The computer-readable medium further includes code for causing the at least one computer to deactivate the packet data context based at least in part on one or more parameters of the second access point.

Moreover, in an aspect, an apparatus for deactivating a packet data context for local IP offload is provided that includes a context establishing component for receiving a registration request from a device at a first access point and a local IP offload status determining component for determining that the device has a packet data context with a second access point for communicating using a local IP offload. The apparatus further includes a context deactivating component for deactivating the packet data context based at least in part on one or more parameters of the second access point.

According to yet another example, a method for indicating whether local IP offload is supported is provided that includes receiving one or more local IP offload parameters specifying whether a local IP offload is enabled or disabled for an access point and providing an indicator of a local IP offload support based at least in part on the one or more local IP offload parameters.

In another aspect, an apparatus for indicating whether local IP offload is supported is provided that includes at least one processor configured to receive one or more local IP offload parameters specifying whether a local IP offload is enabled or disabled for an access point. The at least one processor is further configured to provide an indicator of a local IP offload support based at least in part on the one or more local IP offload parameters. In addition, the apparatus includes a memory coupled to the at least one processor.

In yet another aspect, an apparatus for indicating whether local IP offload is supported is provided that includes means for receiving one or more local IP offload parameters specifying whether a local IP offload is enabled or disabled for an access point. The apparatus further includes means for providing an indicator of a local IP offload support based at least in part on the one or more local IP offload parameters.

Still, in another aspect, a computer-program product for indicating whether local IP offload is supported is provided including a computer-readable medium having code for causing at least one computer to receive one or more local IP offload parameters specifying whether a local IP offload is enabled or disabled for an access point. The computer-readable medium further includes code for causing the at least one computer to provide an indicator of a local IP offload support based at least in part on the one or more local IP offload parameters.

Moreover, in an aspect, an apparatus for indicating whether local IP offload is supported is provided that includes a parameter receiving component for receiving one or more local IP offload parameters specifying whether a local IP offload is enabled or disabled for an access point. The apparatus further includes a local IP offload indicating component for providing an indicator of a local IP offload support based at least in part on the one or more local IP offload parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
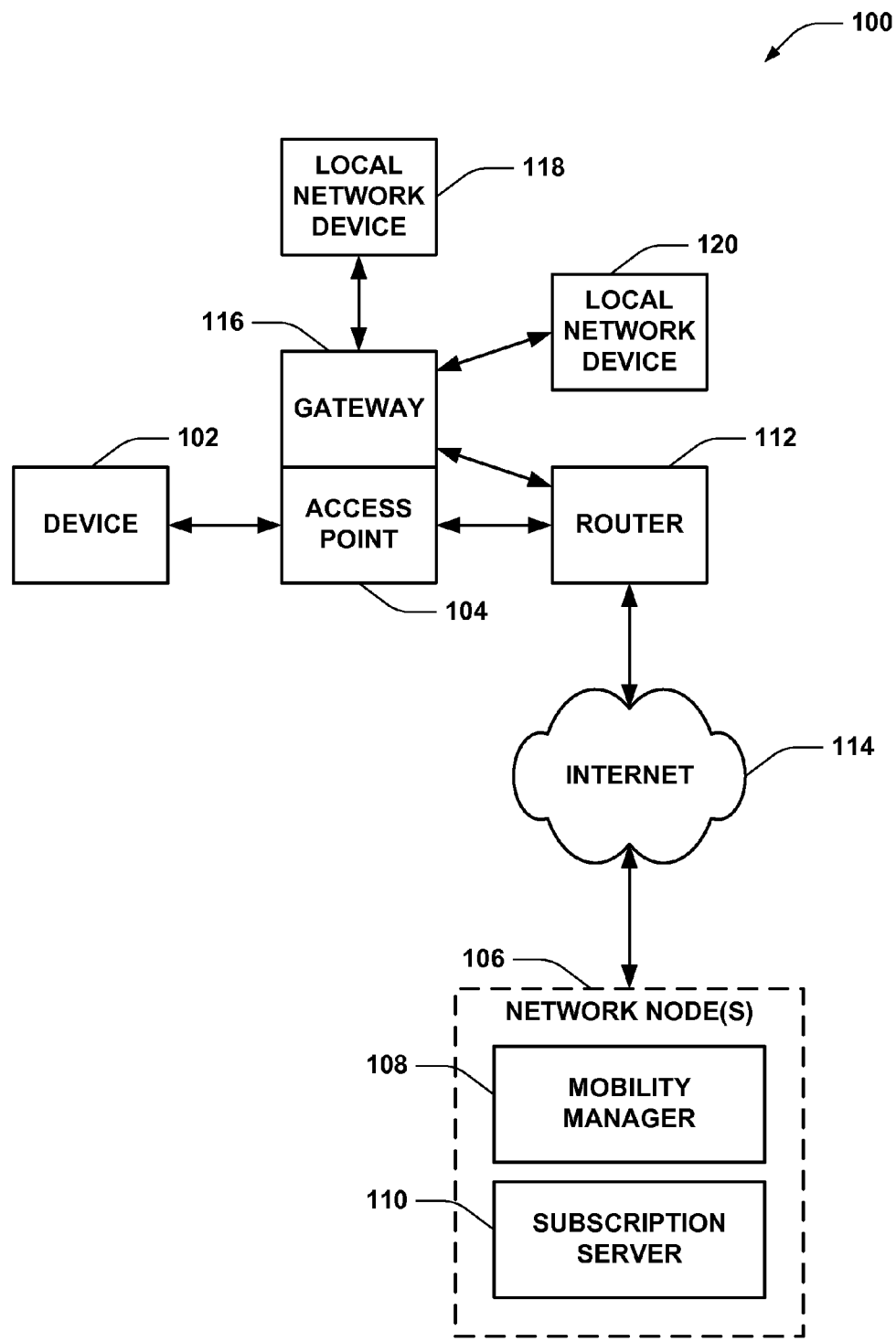
FIG. 1 is a block diagram of an example system that facilitates utilizing local internet protocol (IP) offload.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, local internet protocol (IP) offload functionality, such as local IP access (LIPA), selected IP traffic offload (SIPTO), etc., can be managed for a device based at least in part on one or more indicators or permissions. For example, the one or more indicators or permissions can specify whether the device is allowed to utilize local IP offload, whether a request for a packet data context relates to local IP offload, whether a corresponding home Node B or home evolved Node B (collectively referred to as H(e)NB) or other access point supports local IP offload, whether the device is allowed to utilize local IP offload at the H(e)NB (e.g., and/or with a related closed subscriber group), whether the device is allowed to utilize local IP offload for a specified access point name (APN), whether local IP offload is supported at the H(e)NB for the APN, and/or the like. For example, the one or more permissions can be communicated as part of requesting establishment of a packet data context related to utilizing local IP offload. In addition, in one example, one or more of the indicators can relate to an address of a gateway specified for providing local IP offload. In this regard, the various indicators or permissions can be utilized to provide local IP offload at a device.

Furthermore, in an example, an H(e)NB can provide an indicator that specifies whether the H(e)NB supports local IP offload (e.g., for a specific APN or otherwise). In one example, this can be provided as part of a request for a context forwarded for a related device. In addition, for example, the indicator can include an address of a gateway for providing local IP offload at the H(e)NB, and the gateway can be accordingly utilized to provide local IP offload (e.g., where other indicators specify that local IP offload is allowed). Moreover, as described herein, a context related to local IP offload can be deactivated based at least in part on one or more parameters. For example, deactivation of the context can be determined based at least in part on whether the device has a local IP offload capable connection with another H(e)NB, or cell thereof, that is associated with the current H(e)NB (e.g., a member of the same closed subscriber group (CSG) or other association, etc.) or an H(e)NB not so associated. This can mitigate unnecessary activation/deactivation of contexts related to local IP offload as the device moves among associated H(e)NBs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated are several nodes of a sample communication system 100. For illustration purposes, various aspects of the disclosure are described in the context of one or more devices, access points, and network nodes that communicate with one another. It is to be appreciated, however, that aspects herein may be applicable to other types of apparatuses or other similar apparatuses that are referenced using other terminology. For example, access points can be referred to or implemented as base stations, eNodeBs (eNB), Home Node Bs (e.g., in UMTS) or Home eNBs (e.g., in LTE), collectively referred to as H(e)NBs, femtocell or picocell access points, mobile base stations, relay nodes, hot-spots, routers, gateways, etc., while devices may be referred to or implemented as user equipment (UE), mobile devices, access terminals, modems (or other tethered devices), or may be a portion thereof, and so on.

Device 102 can receive one or more services (e.g., network connectivity) from access point 104. Device 102 can be a wired or wireless device installed within and/or traveling throughout a coverage area provided by access point 104 and/or one or more access points of the system 100. For example, at various points in time, device 102 can connect to an access point 104 or some other access point in the system 100 (not shown) over a wired or wireless interface. Each of these access points can communicate with one or more network nodes (represented, for example, by network node(s) 106) to facilitate wide area network connectivity. Network nodes 106 can include one or more radio and/or core network nodes in a mobile network, for example. Thus, in various examples, network nodes 106 can represent functionality such as at least one of: network management (e.g., via an operation, administration, management (OAM), and/or provisioning entity), call control, session management, mobility management, subscription management, gateway functions, interworking functions, or some other suitable network functionality. Network nodes 106 can include a mobility manager 108, which can be a mobility management entity (MME), serving general packet radio services (GPRS) support node (SGSN), mobile switching center (MSC), visitor location register (VLR), etc., a subscription server 110, which can be a home subscriber server (HSS), home location register (HLR), etc., and/or the like, that can be part of a one or more public land mobile networks (PLMN) accessible by device 102.

In some cases, device 102 can access a restricted group access point (e.g., access point 104) associated with a wireless cell set. In general, a wireless cell set comprises a set of one or more cells (e.g., provided by at least one access point, such as access point 104) having a defined relationship. An example of a wireless cell set is a closed subscriber group (CSG). For convenience, the discussion that follows may simply refer to the term CSG, rather than the more general term wireless cell set. It should be appreciated, however, that the described concepts may be applicable to other types of defined sets or groups (e.g., restricted groups) of wireless cells or other similar entities. Also, restricted groups can provide a diminished level of access to non-members (which can be referred to as hybrid-mode access, or the cells within the group as hybrid cells), to which aspects described herein can apply as well. In addition, it is to be appreciated that an access point, such as access point 104, can provide one or more cells within which devices can communicate with the access point.

As depicted, access point 104 can be coupled to a router 112 or other device to access Internet 114, and access point 104 can allow device 102 to communicate with network nodes 106 via Internet 114. In another example, access point 104 can connect to Internet 114 using a direct broadband connection (e.g., via a modem). Moreover, for example, access point 104 can be coupled to a gateway 116. Though shown as co-located with access point 104 in the depicted example, it is to be appreciated that gateway 116 can be implemented within access point 104, as a separate entity from access point 104, and/or the like. Moreover, for example, router 112 can be similarly co-located with access point 104 and/or gateway 116, implemented within access point 104, and/or the like. In any case, access point 104 can receive communications from device 102 intended for nodes in a mobile network and can forward the communications to network nodes 106 through router 112. For example, the communications can be associated with one or more communications tunnels, and access point 104 can determine that the packets are intended for one or more of network nodes 106 based on the one or more communications tunnels (e.g., based on one or more parameters, such as a tunnel identifier, destination address, etc., in one or more packet headers).

For example, to facilitate communicating between device 102 and gateway 116, a radio bearer can be established between access point 104 and device 102. For example, a first mobile network bearer between gateway 116 and another component of the mobile network, such as network node 106, can be established, as well as a second mobile network bearer between access point 104 and the other component of the mobile network (e.g., before, after, and/or as part of establishing the radio bearer). Thus, in one example, communications related to device 102 intended for gateway 116 can traverse the other component of the mobile network from access point 104 to arrive at gateway 116.

In addition, for example, access point 104 can provide one or more local IP offload functionalities to facilitate at least one of decreasing load on the network nodes 106, providing access to local network resources, and/or the like. In one example, access point 104 can provide SIPTO to communications from device 102. In this example, a SIPTO bearer or other communication tunnel can be established between access point 104 and gateway 116 for allowing device 102 communications with one or more nodes over the Internet 114 without engaging network nodes 106 or components of the mobile network. In one example, data received over the radio bearer between device 102 and access point 104 can be sent over the SIPTO bearer between access point 104 and gateway 116. In another example, access point 104 can utilize the SIPTO bearer between access point 104 and gateway 116 to offload communications received over a previously established bearer where access point 104 determines that the communications are associated with an Internet node that does not require communicating through one or more of the network nodes 106. For example, this can include determining that the communications are not associated with one or more tunnels related to the network nodes 106. In this regard, traffic from device 102 can be offloaded using SIPTO to access Internet 114 without engaging network nodes 106 to decrease loading on the mobile network.

In another example, gateway 116 additionally communicates with local network devices 118 and 120 to provide sharing of resources therebetween, access to Internet 114 via router 112, and/or the like. For example, local network devices 118 and 120 can be substantially any device operable to communicate in a network, such as a local area network (LAN) or wireless LAN (WLAN) device (e.g., a computer, server, printer, digital video recorder (DVR), mobile device, a portion thereof, or substantially any device with a processor (or access to a processor) and a network interface, etc.), and/or the like. Moreover, since access point 104 is coupled with gateway 116, for example, access point 104 participates in the local network with local network devices 118 and 120, and can thus access resources or services offered by local network devices 118 and/or 120 in the local network, and/or can allow access to resources related to access point 104 or provide services thereto. In another example, local network devices 118 and 120 can be connected to router 112, which can similarly provide access thereto.

In this regard, access point 104 can provide LIPA to device 102 by similarly establishing a LIPA bearer with gateway 116. In this example, devices, such as device 102, can perform actions such as at least one of accessing the services or resources of the local network, providing local network devices with 118 and 120 with services or access to resources of the device via access point 104, and/or the like through gateway 116 via access point 104 without traversing network node 106 or similar nodes of the mobile network.

As described further herein, mobility manager 108 can facilitate establishing a LIPA, SIPTO, or other local IP offload context at access point 104 for allowing device 102 to directly access resources of gateway 116. Establishing of the context at mobility manager 108 can be based at least in part on one or more indicators or permissions regarding whether the local IP offloading is allowed at various levels. For example, the one or more indicators or permissions can relate to one or more of whether the device 102 is allowed to utilize local IP offload (e.g., based on one or more other parameters), whether a request for a packet data context relates to local IP offload, whether the access point 104 supports local IP offload, whether the device 102 is allowed to utilize local IP offload at the access point 104 (e.g., and/or with a related CSG), whether the device 102 is allowed to utilize local IP offload for a specified access point name (APN), whether local IP offload is supported at the access point 104 for the APN, and/or the like. The indicators or permissions can be received from various nodes to control local IP offload functionality at access point 104. In one example, mobility manager 108 can communicate with subscription server 110 to receive subscription data for device 102, and the subscription data can include one or more such permissions. In another example, access point 104 can provide one or more such indicators to mobility manager 108 (e.g., an IP address of a gateway, such as gateway 116, that supports local IP offload, or another indicator).

Figure 2:
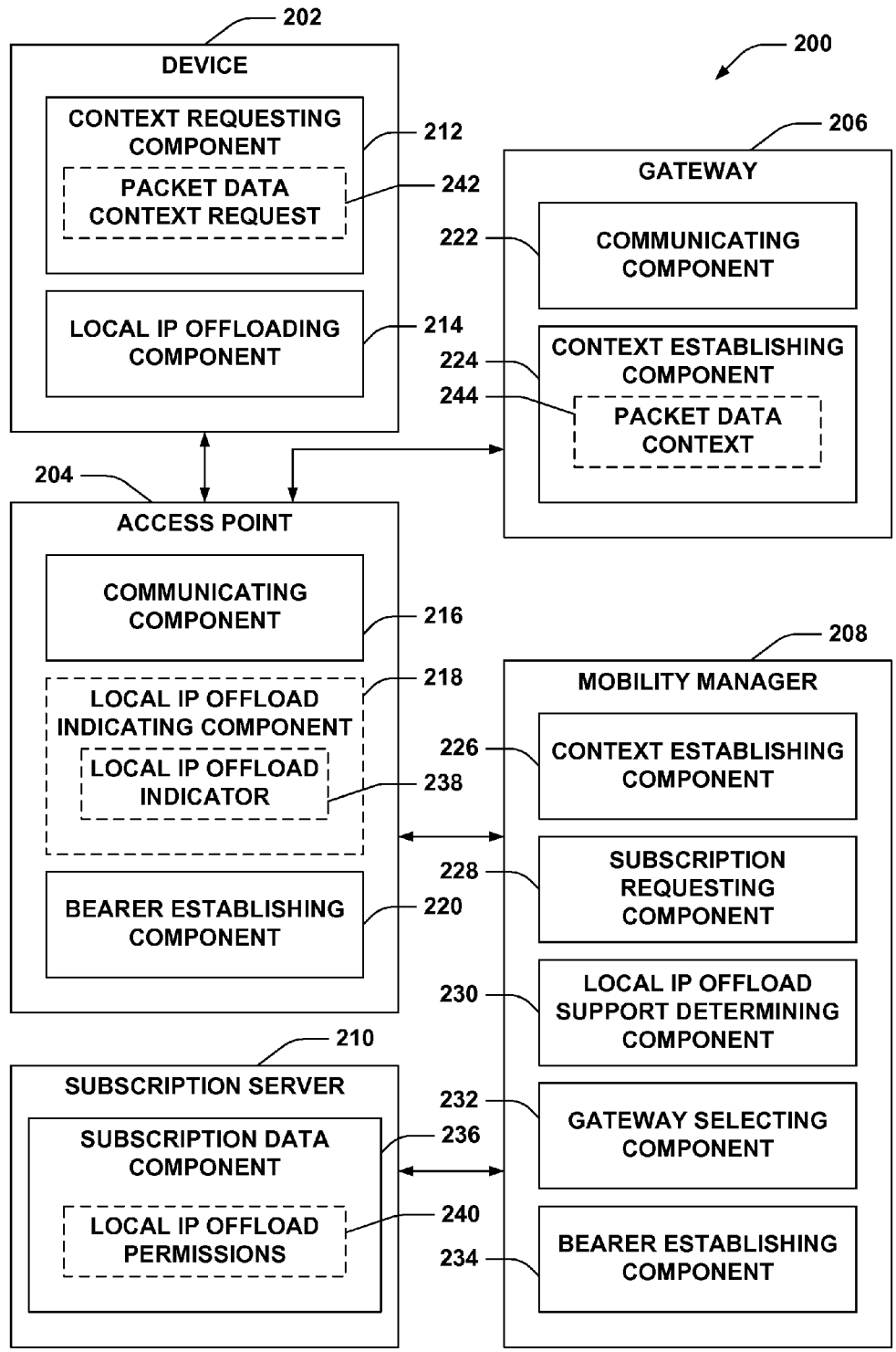
FIG. 2 is a block diagram of an example system for establishing a packet data context for local IP offload according to one or more indicators.

Turning to FIG. 2, an example wireless communication system 200 is illustrated that facilitates supporting local IP offload at an access point. System 200 can include a device 202 that can communicate with one or more access points to receive access to a wireless network, an access point 204 that provides open or restricted access or a combination thereof to one or more devices, a gateway 206 that facilitates communicating with one or more networks, and a mobility manager 208 that authorizes one or more devices to communicate with one or more core network components. In one example, device 202 can be a UE, modem (or other tethered device), a portion thereof, and/or the like, and access point can be a femtocell, picocell, H(e)NB, or similar access point, a portion thereof, etc., as described. In addition, for example, gateway 206 can be a substantially any gateway or router, such as but not limited to a serving gateway (S-GW) packet data network (PDN) gateway (P-GW), a gateway GPRS support node (GGSN), etc., and mobility manager 208 can be a MME, SGSN, MSC, VLR, or similar node. In addition, as described, gateway 206 can be co-located and/or implemented within access point 204 in another example. Subscription server 210 can be an HSS, HLR, or similar component. Moreover, it is to be appreciated that additional components or nodes can be present between those shown (e.g., one or more gateways or routers can be present between access point 204 and gateway 206, between access point 204 and mobility manager 208, between mobility manager 208 and subscription server 210, etc.) to facilitate access.

Device 202 can comprise a context requesting component 212 for requesting establishing of a context for local IP offload functionality (e.g., LIPA, SIPTO, etc.), and a local IP offloading component 214 for utilizing the context to perform local IP offloading. Access point 204 can comprise a communicating component 216 for facilitating communicating between one or more devices 202 and one or more gateways or other components, and an optional local IP offload indicating component 218 for specifying whether access point 204 supports local IP offload. Access point 204 also comprises a bearer establishing component 220 for establishing a bearer between a various devices and/or components for communicating local IP offload data therebetween.

Gateway 206 comprises a communicating component 222 for receiving data from and/or transmitting data to an access point and one or more network components, such as a mobility manager, another gateway, one or more nodes in a local network, one or more nodes over a broadband connection, and/or the like. Gateway 206 additionally comprises a context establishing component 224 for generating a context for a device to facilitate communicating local IP offload data. Mobility manager 208 comprises a context establishing component 226 for requesting creation of a context for a device for communicating local IP offload data, and a local IP offload support determining component 230 for determining whether one or more indicators or permissions specify that local IP offload is supported. Mobility manager 208 also comprises a gateway selecting component 232 for specifying a gateway to receive and/or respond to local IP offload data requests from the device, and a bearer establishing component 234 for indicating establishing a bearer between various components and/or devices. Subscription server 210 comprises a subscription data component 236 for indicating subscription data of a device to one or more nodes in a wireless network.

According to an example, context requesting component 212 can transmit a packet data context request 242 to access point 204. A packet data context, as referred to herein, can comprise a PDN connection, packet data protocol (PDP) context, and/or the like. For example, the request 242 can relate to establishing the packet data context for local IP offload, such as LIPA, SIPTO, etc. at access point 204. Communicating component 216 can receive and forward the request 242 to mobility manager 208. For example, one or more packets encompassing the request 242 can include a destination address of the mobility manager 208. In one example, mobility manager 208 can be part of a similar network (e.g., PLMN) as access point 204, and can be utilized to authorize device 202 to use the network, whether the network is a home or visited network of device 202. For example, as described, access point 204 can communicate with mobility manager 208 via one or more gateways in the mobile network (not shown). In any case, context establishing component 226 can obtain the request 242 for packet data context from access point 204.

In one example, subscription requesting component 228 can formulate a request for subscription data related to device 202 and can transmit the request to subscription server 210. It is to be appreciated that this can occur as part of device 202 initially communicating in a network associated with mobility manager 208, as part of receiving the request for the packet data context, and/or the like. Subscription data component 236, for example, can receive the request for subscription data, and subscription data component 236 can transmit subscription data stored for device 202 to mobility manager 208. For example, the subscription data can include data stored by an HSS or similar subscription server, such as one or more identities related to device 202 or a subscriber thereof, a list of CSGs of which device 202 is a member, and/or the like. In addition, subscription data component 236 can store one or more local IP offload permissions 240 for device 202 that specify whether device 202 can utilize local IP offload.

For example, the local IP offload permissions 240 can specify whether device 202 can utilize local IP offload in general, for certain types of packet data contexts (e.g., based at least in part on an APN), and/or the like. For example, the local IP offload permissions 240 can include a data structure that specifies a list of APNs, where each APN can have an associated local IP offload permission. In another example, the local IP offload permissions 240 can include a list of APNs for which the device is allowed to utilize local IP offload, as described further herein. Thus, for example, local IP offload permissions 240 can include the list of APNs. In yet another example, it is to be appreciated that subscription requesting component 228 can explicitly request all local IP offload permissions for device 202, local IP offload permissions for a specific APN, etc.

In any case, for example, subscription requesting component 228 can receive the subscription data, which can include local IP offload permissions 240. Local IP offload support determining component 230 can additionally or alternatively determine whether the packet data context request 242 relates to local IP offload based at least in part on whether the subscription data includes permissions for an APN specified in the request 242 as related to local IP offload. For example, this can include identifying the relevant local IP offload permissions 240 where more than one is communicated by subscription server 210. Where one or more APNs with corresponding local IP offload permissions are received, this can include locating a permission for an APN specified in the packet data context request 242. Where a list of APNs supporting local IP offload are received, for example, this can include locating the APN in the list of APNs.

Where the local IP offload support determining component 230 determines that the device 202 is not allowed local IP offload or that the request 242 does not relate to local IP offload based on the local IP offload permissions 240 (e.g., where a related APN is not in a list of APNs or has a local IP offload permission that specifies that local IP offload is not supported), context establishing component 226 can determine to not establish the requested context and can transmit a rejection or other indication that the context is not established to access point 204 for providing to device 202. Where the local IP offload support determining component 230 determines that the device 202 is allowed to utilize local IP offload based on the local IP offload permissions 240, gateway selecting component 232 can determine a gateway for providing local IP offload functionality, as described for example.

In an additional or alternative example, local IP offload indicating component 218 can optionally insert a local IP offload indicator 238, which specifies whether access point 204 supports local IP offload, in requests forwarded from device 202 (e.g., in each packet data context request, each packet data context request related to local IP offload, and/or the like). Context establishing component 226 can receive the local IP offload indicator 238 in the packet data context request 242, and local IP offload support determining component 230 can additionally or alternatively verify that local IP offload is supported at access point 204 based on local IP offload indicator 238. In one example, the local IP offload indicator 238 can be and/or can include an address of a gateway related to the local IP offload (e.g., a gateway to receive local IP offload data from device 202), and thus gateway selecting component 232 can determine the gateway based at least additionally in part on the address.

The gateway can be gateway 206 or a different gateway, for example. Where a gateway address is not received in local IP offload indicator 238, for example, gateway selecting component 232 can determine the gateway based at least in part on a domain name service (DNS) lookup of one or more identifiers. For example, this can include a DNS lookup of one or more identifiers, such as a routing area identifier (RAI), APN, etc., related to device 202 or access point 204 (e.g., based on a fully qualified domain name generated from the identifier(s)). In another example, at least a portion of the one or more identifiers can be received in subscription data for the device 202, as described. For example, context establishing component 226 can receive the identifiers as part of the packet data context request 242 and/or upon initially communicating with access point 204 and/or device 202. In another example, the identifiers and/or gateway address can be received in device subscription data. In the depicted example, in any case, gateway selecting component 232 can determine to select gateway 206, and context establishing component 226 can request establishment of a packet data context for device 202 from the gateway 206 for device 202. Context establishing component 224 can receive the request and can establish the packet data context 244 for device 202 to support local IP offload (e.g., LIPA, SIPTO, etc.).

In an example, context establishing component 224 can notify mobility manager 208 of successful or failed establishment of the packet data context 244. Where the establishment fails, context establishing component 226 can notify access point 204 of the failure for providing to device 202. Where the establishment succeeds, for example, bearer establishing component 234 can request establishment of a bearer from access point 204 to gateway 206 for communicating local IP offload data from device 202 to gateway 206 related to the packet data context. As described, for example, this can be in addition to bearers established between the gateway 206 and a mobile network component (e.g., S-GW), and between the access point 204 and the mobile network component. Establishment of the bearer between access point 204 and gateway 306 can allow circumvention of the mobile network when communicating local IP offload data. Bearer establishing component 220 can receive the request and can attempt to establish a bearer for the local IP offload data from device 202. Moreover, for example, bearer establishing component 234 can include a request to establish a corresponding radio bearer with device 202, as described, and bearer establishing component 220 can establish the radio bearer with device 202. Bearer establishing component 234 can additionally include information regarding the packet data context 244 in the bearer establishment request to facilitate associating the bearer with the packet data context at access point 204. If bearer establishment fails, for example, access point 204 can notify mobility manager 208, and context establishing component 226 can transmit an indication of a failed context establishment to access point 204 for providing to device 202. Moreover, in an example, context establishing component 226 can notify gateway 206 (e.g., and gateway 206 can delete the packet data context 244).

Where bearer establishment succeeds, however, context establishing component 226 can associate the packet data context 244 created by gateway 206 for device 202 with the bearer. Context establishing component 226 can provide the packet data context 244 to device 202 (e.g., via access point 204). Context requesting component 212 can obtain the packet data context 244. In this regard, local IP offloading component 214 can communicate with access point 204 using the packet data context 244 and/or radio bearer with access point 204 for local IP offload communications. Communicating component 216 can identify communications related to the packet data context 244 (e.g., based at least in part on receiving the communications over the radio bearer established for local IP offload communications) and can utilize the corresponding bearer with gateway 206 to route the local IP offload communications to gateway 206.

In one example, the local IP offload functionality can be LIPA, as described. Thus, context requesting component 212 can transmit packet data context requests 242 for LIPA. In one example, this can include requesting a packet data context for an APN that utilizes LIPA. In this example, context establishing component 226 can receive the packet data context request 242, and local IP offload support determining component 230 can determine whether the device 202 associates the APN with LIPA based at least in part on the subscription data for device 202 obtained by subscription requesting component 228. As described, for example, this can include determining whether one or more local IP offload permissions 240 specify that LIPA is allowed for the APN. If so, in this example, context establishing component 226 can determine whether the LIPA request includes a local IP offload indicator 238, such as a gateway IP address, as described. If the local IP offload indicator 238 is not included (e.g., and/or the indicator is set to not allow LIPA), in one example, context establishing component 226 can refrain from establishing the packet data context and can notify device 202 of failure in establishing the context, as described.

If the LIPA request does include the local IP offload indicator 238 and/or the indicator specifies that LIPA is allowed at access point 204, local IP offload support determining component 230 can determine to establish LIPA for device 202, and gateway selecting component 232 can select a gateway indicated by the local IP offload indicator 238 for providing such. As described, bearer establishing component 220 can establish a LIPA bearer between access point 204 and gateway 206 (and/or a corresponding radio bearer between access point 204 and device 202) associated with a created packet data context for utilizing LIPA. Communicating component 216 can forward the LIPA requests over the established LIPA bearer for device 202 to gateway 206. Communicating component 222 can receive the LIPA request over the bearer and can accordingly provide LIPA to one or more local network devices (not shown) that communicate with gateway 206 in an IP or similar network, as described. Similarly, communicating component 222 can utilize the LIPA bearer to communicate data from local network devices to device 202 (e.g., through access point using communicating component 216).

Moreover, in an example, in addition to device subscription data, subscription data component 236 can additionally provide, and subscription requesting component 228 can additionally receive, CSG subscription data for device 202 that includes one or more CSGs of which device 202 is a member. The CSG subscription data can include one or more local IP offload permissions 240 for each APN within a given CSG for which LIPA is supported. As described, this can be a list of APNs associated with a given CSG, each of which have a corresponding LIPA permission, a list of APNs that support LIPA in the CSG, and/or the like. In this regard, local IP offload support determining component 230 can determine whether to provide local IP offload to device 202 further based at least in part on the local IP offload permissions 240 for the APN and the CSG related to access point 204. Thus, for example, local IP offload support determining component 230 can discern whether the CSG subscription data includes parameters related to the CSG of access point 204. If so, local IP offload support determining component 230 can retrieve information from the parameters that correspond to the APN.

In this example, if the information includes local IP offload permissions 240 for the APN in the CSG, local IP offload support determining component 230 can verify that the APN supports LIPA in the CSG, as described. If no local IP offload permissions 240 for the APN exist in the parameters for the CSG (e.g., or the permissions specify that LIPA is not allowed), the context establishing component 226 can refrain from establishing the context and indicate failure to device 202, as described.

Furthermore, for example, the local IP offload permissions 240 for a specific APN can specify that the APN is LIPA only (such that LIPA is required to establish the packet data context), LIPA prohibited (such that the packet data context is established through the mobile network), LIPA conditional (such that LIPA can be initialized for the packet data context if supported, otherwise the packet data context is established through the mobile network), etc. For example, where local IP offload permissions 240 received in device subscription data specify LIPA only for an APN, local IP offload support determining component 230 can receive and analyze other LIPA indicators to determine whether LIPA is supported (e.g., by access point 204), etc. If not, context establishing component 226 can refrain from establishing the packet data context and can notify device 202 of failure in context establishment, as described. For example, the other LIPA indicators can include local IP offload indicator 238, a list of APNs for which LIPA is supported at access point 204 received from the access point 204 or other node, permissions that specify whether a CSG related to access point 204 is a CSG that corresponds to the APN in the CSG subscription data, and/or the like.

Where local IP offload permissions 240 specify LIPA conditional, however, and local IP offload support determining component 230 determines that LIPA is not supported based on other local IP offload indicators, gateway selecting component 232 can determine a gateway for establishing the packet data context through the mobile network. For example, at least a portion of an identifier or address related to the gateway can be received in subscription data received by subscription requesting component 228 from subscription data component 236 (e.g., which may or may not require a DNS lookup of an identifier, such as one or more RAIs, APNs, etc. received in subscription data and/or from access point 204). Thus, the packet data context is still established without using LIPA.

In a specific example, local IP offload permissions 240 can specify LIPA only for an APN "printer" related to a printer in a local network related to access point 204. In this example, where device 202 is communicating with access point 204, local IP offload support determining component 230 can determine whether access point 204 supports LIPA for the "printer" APN. As described, this can be based on determining whether the "printer" APN is present in a supported list of APNs received for access point 204 (e.g., as part of the CSG subscription information for device 202, etc.). In another example, this can include determining whether the "printer" APN is listed for APNs of the CSG of access point 204 (e.g., as received in the CSG subscription information), and/or the like. If not, context establishing component 226 can reject establishing the packet data context, as described. If so, the packet data context for LIPA to the "printer" APN can be established, as described.

In another specific example, however, local IP offload permissions 240 can specify LIPA conditional for an APN "corporate" where access point 204 is in a network of an enterprise related to the APN "corporate." Local IP offload support determining component 230 can similarly determine whether access point 204 supports LIPA for the "corporate" APN based on a list of APNs, verifying the CSG corresponds to the APN, and/or the like, as received in CSG subscription information for device 202, for example. If not, gateway selecting component 232 can determine a gateway of the mobile network (not shown) for facilitating communicating with the "corporate" APN, and a non-LIPA packet data context can be established. If so, gateway selecting component 232 can select a gateway indicated by local IP offload indicator 238 for establishing the LIPA packet data context, as described. Thus, where the device 202 is within the enterprise and can communicate with access point 204 in the enterprise network, LIPA can be established to facilitate communicating without engaging the mobile network. Where, however, device 202 is outside of the enterprise communicating with an access point 204 not on the enterprise network, a mobile connection can be established for utilizing a virtual private network (VPN) to tunnel communications with the enterprise network.

In another example, the local IP offload functionality can be SIPTO. In this example, the access point may not indicate whether SIPTO is supported at access point 204 in a local IP offload indicator 238. Thus, local IP offload support determining component 230 can determine whether to provide SIPTO to device 202 based at least in part on whether the device 202 is allowed to use SIPTO. For example, this can include determining whether an APN in the request for packet data context is a SIPTO APN (e.g., according to subscription data received by subscription requesting component 228, as described above, which can include one or more corresponding local IP offload permissions 240). If so, gateway selecting component 232 can determine a gateway for providing SIPTO for device 202 based at least in part on performing a DNS lookup using one or more identifiers of the device 202 or access point 204 (e.g., to form a full qualified domain name). In one example, the identifier can be received in device subscription data as an RAI, APN, etc., from access point 204 (e.g., in the request for packet data context and/or a subsequent response to a request for the gateway sent by gateway selecting component 232 or otherwise), and/or the like. Once gateway 206 is identified, context establishing component 226 can request context establishment, bearer establishing component 234 can request establishment of a bearer between access point 204 and gateway 206 (and/or a corresponding radio bearer between access point 204 and device 202, as described) for associating to the context, etc. Local IP offloading component 214 can then use the context for communicating using SIPTO, as described.

Figure 3:
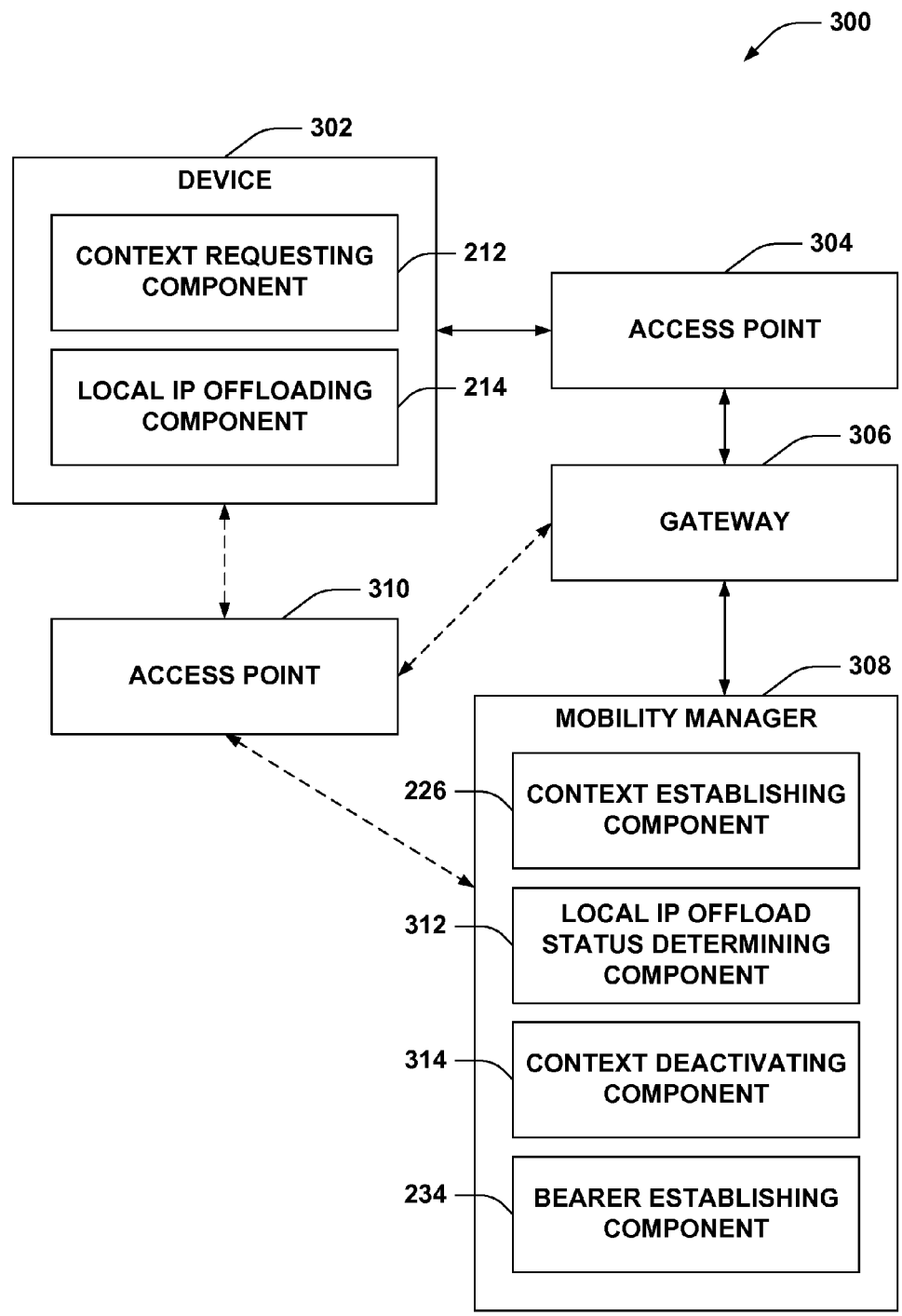
FIG. 3 is a block diagram of an example system for deactivating a packet data context.

Turning to FIG. 3, an example wireless communication system 300 is depicted that facilitates deactivating a packet data context for a device. System 300 can comprise a device 302 that communicates with an access point 304 to receive access to a wireless network. Access point 304 can communicate with gateway 306, for example, to access a mobile network for device 302. In an example, gateway 306 can communicate with mobility manager 308 or one or more other network nodes, as described. System 300 also includes another access point 310 with which device 302 can communicate to receive wireless network access. In addition, as described, device 302 can be a UE, modem (or other tethered device), a portion thereof, and/or the like, and access points 304 and 310 can each be a femtocell, picocell, H(e)NB, or similar access point, a portion thereof, etc., as described. In addition, for example, gateway 306 can be substantially any gateway or router, such as but not limited to a packet data network (PDN) gateway, a GGSN, etc., and mobility manager 308 can be a MME, SGSN, MSC, VLR, or similar node. Moreover, it is to be appreciated that additional components or nodes can be present between those shown (e.g., one or more gateways can be present between access point 304 and gateway 306, between gateway 306 and mobility manager 308, etc.) to facilitate access.

Device 302 can comprise a context requesting component 212 for requesting a packet data context for local IP offloading (e.g., LIPA, SIPTO, etc.), and a local IP offloading component 214 for utilizing the packet data context to perform local IP offloading, as described. Mobility manager 308 can include a context establishing component 226 for creating a packet data context for a device, as described above. Mobility manager 308 also comprises a local IP offload status determining component 312 for discerning whether a device is using local IP offloading with an access point, a context deactivating component 314 for deactivating a packet data context according to one or more parameters, and a bearer establishing component 234 for establishing a bearer for a packet data context, as described.

According to an example, context requesting component 212 can request establishment of a packet data context for utilizing local IP offloading, as described, at access point 304. Context establishing component 226 can establish the packet data context and notify device 202, as described. In this regard, it is to be appreciated that device 302, access point 304, gateway 306, and mobility manager 308 can be similar to device 202, access point 204, gateway 206, and mobility manager 208 respectively, and can thus include similar components as described in FIG. 2. In addition, however, device 302 can reselect among access points in a wireless network (e.g., as device moves throughout the wireless network and receives improved signal quality from different access points, etc.). In one example, device 302 can reselect access point 310, which can also communicate with mobility manager 308 and/or other components of the wireless network. In one example, access points 304 and 310 can be different cells of the same H(e)NB. In another example, access point 304 can be an H(e)NB, and access point 310 can be an eNB. Access point 310 can communicate with mobility manager 308, for example, using gateway 306 or one or more other gateways.

Upon reselecting access point 310, context deactivating component 314 can determine whether to deactivate the packet data context established with access point 304. In one example, context requesting component 212 can request establishment of a packet data context for local IP offloading (e.g., and/or device 302 can otherwise request registration with access point 310). For example, the packet data context can be requested to continue local IP offloading using the context initialized through access point 304, as described. In some cases, it can be desirable for mobility manager 308 to use the same packet data context for device 302 when communicating through another access point 310. For example, local IP offload status determining component 312 can determine whether device 302 has a packet data context established. For example, this can include analyzing one or more parameters related to the packet data context. If the parameters are present, for example, local IP offload status determining component 312 can determine device 302 has a packet data context established with another access point (e.g., access point 304), and thus, local IP offload status determining component 312 can determine whether to maintain or deactivate the packet data context in favor of a new packet data context for device 302.

For example, local IP offload status determining component 312 can obtain an address of a gateway received as a local IP offload indicator from access point 304 in the request for packet data context from device 302, as described, as well as another address of a gateway received as a local IP offload indicator from access point 310 in another request for packet data context from device 302. If the addresses are the same, for example, local IP offload status determining component 312 can maintain the current packet data context, and bearer establishing component 234 can request establishment of a bearer between access point 310 and gateway 306 and/or a radio bearer between device 302 and access point 310. In this regard, context establishing component 226 can associate the packet data context with the one or more bearers, and can provide the packet data context to device 302 and/or an indication that the current packet data context can continue to be utilized.

Where access point 310 does not indicate the same gateway address in the local IP offload indicator, for example, context deactivating component 314 can deactivate the packet data context established based on the request from access point 304. For example, context deactivating component 314 can notify gateway 306 to delete the packet data context, bearer establishing component 234 can notify access point 304 that the bearer between device 302 and access point 304 associated with the packet data context can be deactivated, etc. In addition, context establishing component 226 can then create a new packet data context for local IP offload at device 302 through another gateway (not shown) specified in the local IP offload indicator from access point 310, as described above. In another example, local IP offload status determining component 312 can determine whether access point 310 is within a range or geographic region for providing local IP offload using gateway 306 (e.g., which can be specified by gateway 306). If not, context deactivating component 314 can deactivate the packet data context established based on the request from access point 304, etc., as described.

In yet another example, local IP offload status determining component 312 can maintain an identifier related to access point 304 upon context establishing component 226 creating the packet data context for using local IP offload with access point 304. Upon receiving a request for a packet data context from device 302 related to access point 310, local IP offload status determining component 312 can compare the identifier to a similar identifier of access point 310. If the identifiers do not match, for example, context deactivating component 314 can deactivate the context, etc., as described. For example, the identifiers can relate to a global cell identifier of access point 304 and access point 310, a CSG identifier of access point 304 and access point 310, and/or the like. Thus, for example, where the identifier is a CSG identifier of access point 304 and 310, context deactivating component 314 deactivates the packet data context when the device 302 moves from one CSG to another.

Figure 4:
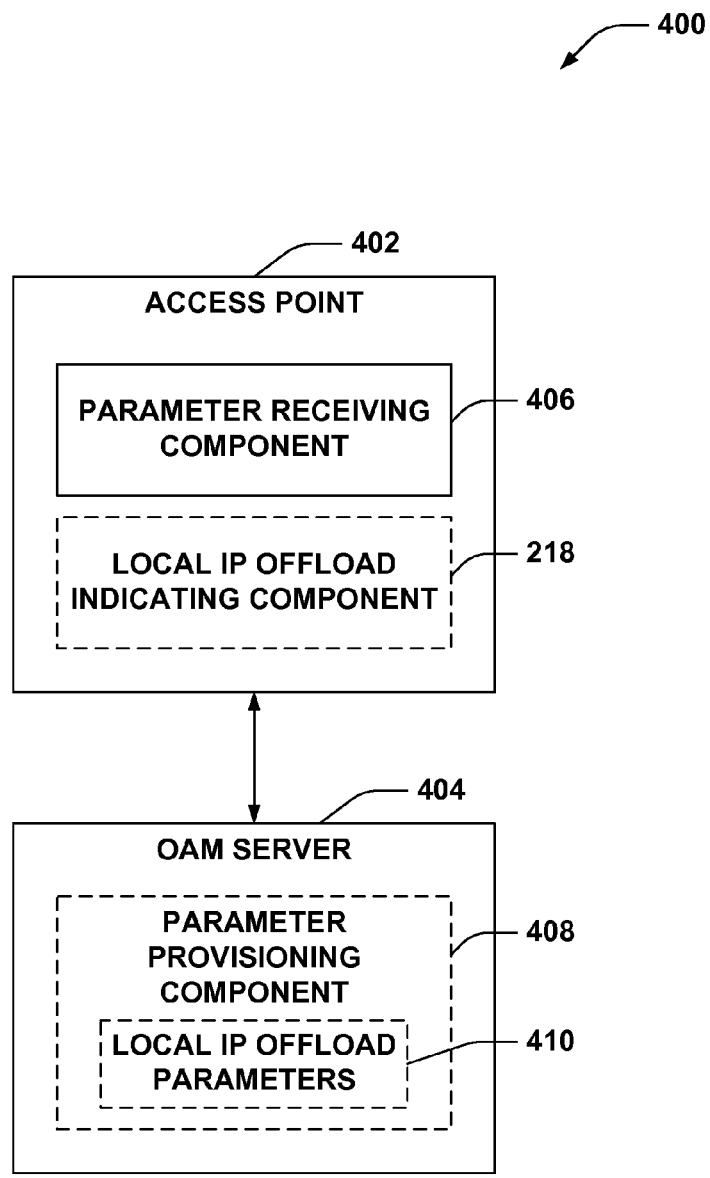
FIG. 4 is a block diagram of an example system that facilitates indicating local IP offload support.

Referring to FIG. 4, an example wireless communication system 400 is illustrated for communicating one or more local IP offload parameters to an access point 402. System 400 comprises an access point 402, which can provide wireless network access to one or more devices, and can be similar to access points 204, 304, and/or 310. System 400 also comprises an OAM server 404 that provisions one or more parameters to access points and/or other nodes in a wireless network. For example, a network operator can set parameters in the OAM server 404 providing to the nodes.

Access point 402 can comprise a parameter receiving component 406 for obtaining one or more local IP offload parameters for access point 402, and a local IP offload indicating component 218 for providing the local IP offload indicator to one or more nodes. OAM server 404 can comprise a parameter provisioning component 408 for providing one or more local IP offload parameters to an access point 402.

According to an example, parameter provisioning component 408 can store one or more local IP offload parameters 410 for access point 402. For example, the local IP offload parameters 410 can be include a parameter that specifies whether access point 402 is to support local IP offload. For example, the local IP offload parameters can be set by a network operator. Moreover, for example, the local IP offload parameters 410 stored by parameter provisioning component 408 can include a list of APNs and/or related local IP offload parameters. In either case, parameter provisioning component 408 can communicate one or more of the local IP offload parameters 410 to access point 402. Parameter receiving component 406 can obtain the local IP offload parameters 410, which can be similar to and/or can include local IP offload indicator 238, as described previously.

Local IP offload indicating component 218 can communicate an indicator of local IP offload support to one or more nodes in the wireless network, such as a mobility manager, device, and/or the like, as described, based at least in part on the local IP offload parameters 410. For example, where the one or more local IP offload parameters 410 specify that local IP offload is enabled for access point 402, local IP offload indicating component 218 can include an IP address of a gateway in context establishment requests from one or more devices to indicate that access point 402 supports local IP offload.

Figure 5:
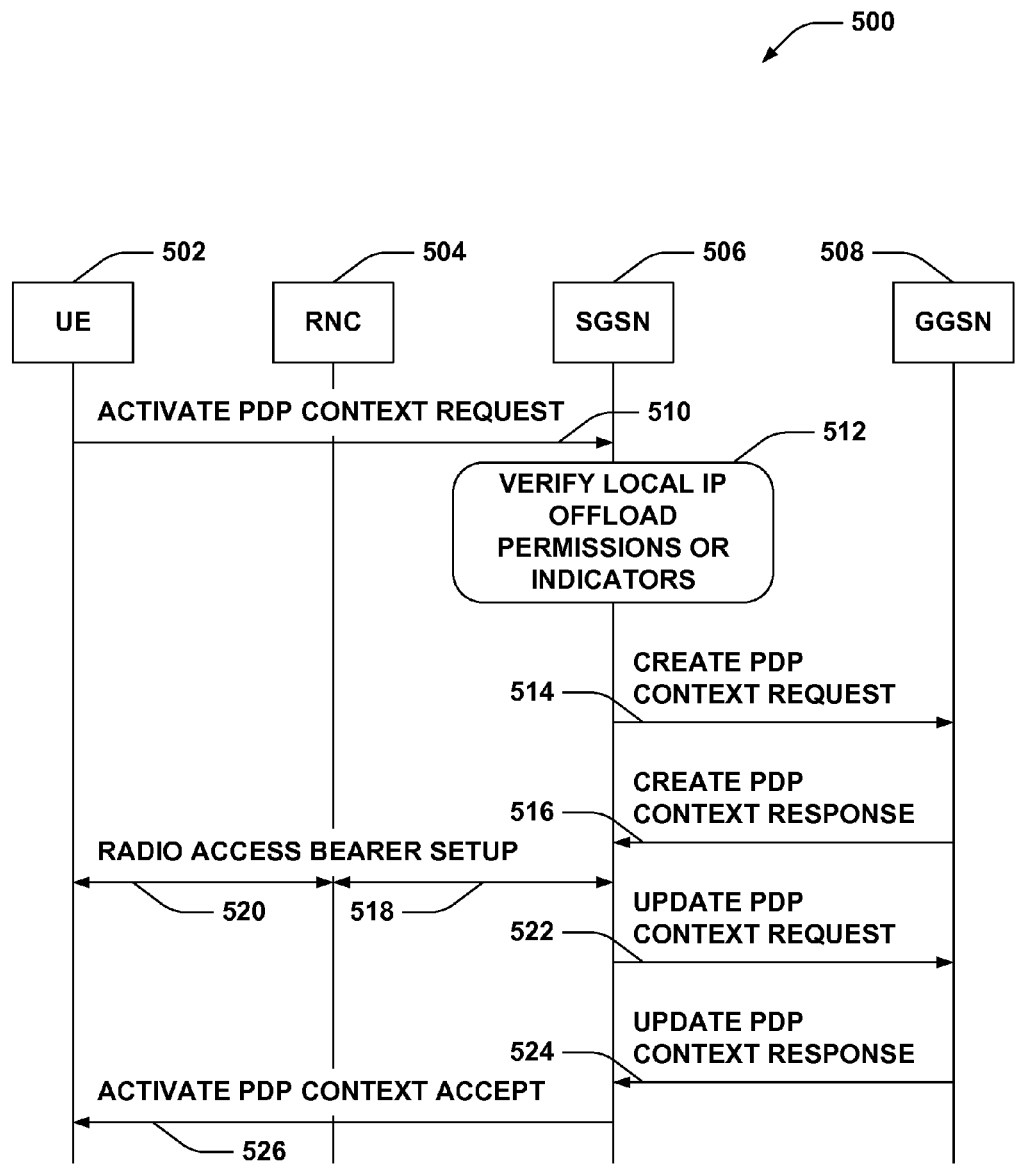
FIG. 5 is an example message flow diagram of an aspect of establishing a packet data protocol (PDP) context for local IP offload.

Referring to FIG. 5, an example message flow diagram of a system 500 is illustrated for establishing a PDP context. System 500 comprises a UE 502 that communicates with a radio network controller (RNC) 504 (e.g., and/or one or more access points related thereto) to receive access to a wireless network. System 500 also comprises an SGSN 506 and GGSN 508. The UE 502, RNC 504, SGSN 506, and GGSN 508 can interact with one another and/or with other nodes to establish a PDP context for UE 502 in UMTS. It is to be appreciated that not all steps or shown for ease of explanation; rather this example illustrates steps that can be modified to provide local IP offload functionality. In an example, UE 502 can transmit an activate PDP context request 510 to SGSN 506 (e.g., via RNC 504) to request establishment of a PDP context. In one example, as described, RNC 504 can include a local IP offload indicator when forwarding activate PDP context request 510 (e.g., which can comprise an address of GGSN 508, etc.). For example, the GGSN 508 can be a local gateway in a similar local IP network of RNC 504, or can be co-located in RNC 504, etc. SGSN 506 can verify local IP offload permission(s) or indicator(s) 512. For example, this can include verifying a local IP offload indicator received from RNC 504 in the activate PDP context request 510 forwarded from UE 502. In another example, as described, SGSN 506 can verify one or more local IP offload permissions in subscription data received for UE 502 (e.g., specific to an APN, a CSG related to RNC 504, etc.). Moreover, as described, the verifying can include verifying that a CSG of RNC 504 supports local IP offload for a specific APN in CSG subscription data for UE 502. In yet another example, the verifying can additionally or alternatively include determining whether RNC 504 supports local IP offload for a specific APN.

If one or more permissions and/or indicators are verified, for example, SGSN 506 can transmit a create PDP context request 514 to GGSN 508 to create a PDP context for UE 502 to utilize local IP offload with RNC 504. SGSN 506 can receive a create PDP context response 516 from GGSN 508 verifying establishment of the PDP context. In this regard, SGSN 506 can request radio access bearer setup 518 from RNC 504, which can setup a radio access bearer 520 with UE 502 for local IP offload. SGSN 506 can transmit an update PDP context request 522 to GGSN 508 to associate the radio access bearer with the PDP context, and GGSN 508 can transmit a update PDP context response 524. Thus, SGSN 508 can transmit an activate PDP context accept 526 to notify UE 502 of the PDP context created for utilizing local IP offload via RNC 504, as described.

Figure 6:
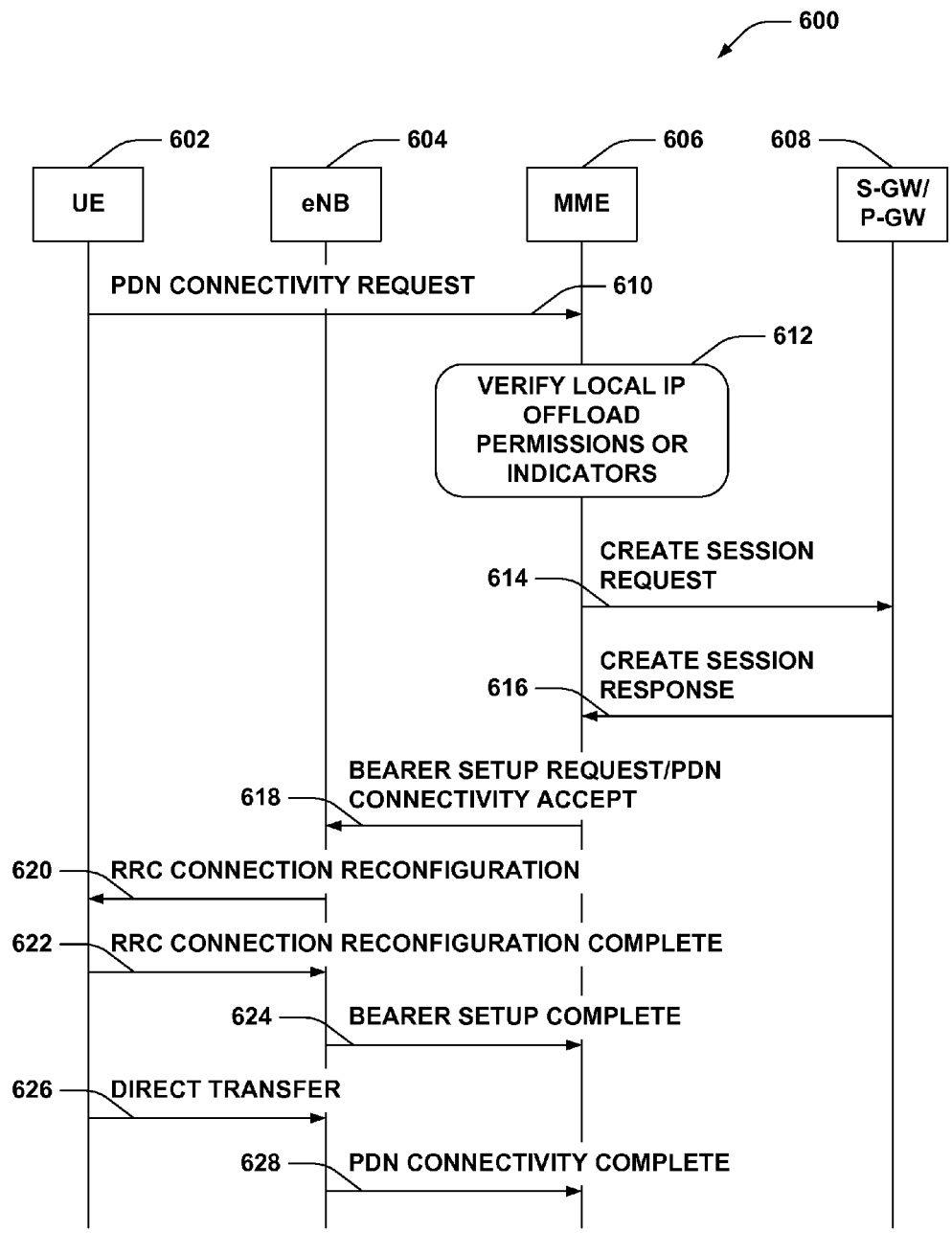
FIG. 6 is an example message flow diagram of an aspect of establishing a packet data network (PDN) connection for local IP offload.

Referring to FIG. 6, an example message flow diagram of a system 600 is illustrated for establishing a PDN connection. System 600 comprises a UE 602 that communicates with an eNB 604 to receive access to a wireless network. System 600 also comprises an MME 606 and S-GW/P-GW 608. The UE 602, eNB 604, MME 606, and S-GW/PGW 608 can interact with one another and/or with other nodes to perform a PDN connection activation in LTE. It is to be appreciated that not all steps are shown for ease of explanation; rather this example illustrates steps that can be modified to provide local IP offload functionality. In an example, UE 602 can transmit a PDN connectivity request 610 to MME 606 (e.g., via eNB 604) to request establishment of a PDN connection, as described previously. In one example, as described, eNB 604 can include a local IP offload indicator when forwarding PDN connectivity request 610 (e.g., which can comprise an address of S-GW/P-GW 608, etc.). For example, the S-GW/P-GW 608 can be a local gateway in a similar local IP network of eNB 604, can be co-located in eNB 604, etc. MME 606 can verify local IP offload permission(s) or indicator(s) 612. For example, the verifying can include verifying a local IP offload indicator received from eNB 604 in the PDN connectivity request 610 forwarded from UE 602. In another example, as described, MME 606 can verify one or more local IP offload permissions in subscription data received for UE 602 (e.g., specific to an APN, a CSG related to eNB 604, etc.). Moreover, as described, the verifying can include verifying that a CSG of eNB 604 supports local IP offload for a specific APN in CSG subscription data for UE 602. In yet another example, this can additionally or alternatively include determining whether eNB 604 supports local IP offload for a specific APN.

If one or more indicators are verified, for example, MME 606 can transmit a create session request 614 to S-GW/P-GW 608 to create a PDN connection for UE 602 to utilize local IP offload with eNB 604. MME 606 can receive a create session response 616 from S-GW/P-GW 608 verifying establishment of the PDN connection. In this regard, MME 606 can transmit a bearer setup request/transmit a PDN connectivity accept 618 to eNB 604, which can transmit an RRC connection reconfiguration 620 to UE 602 to setup a radio bearer therewith. UE 602 can acknowledge bearer establishment by transmitting an RRC connection reconfiguration complete 622 to eNB 604. In turn, eNB 604 can transmit a bearer setup complete 624 to MME 606. UE 602 can perform a direct transfer 626 to eNB 604, and eNB 604 can indicate PDN connectivity complete 628 to MME 606. In this example, UE 02 can utilize the radio bearer established in the RRC connection reconfiguration message exchange (e.g., 620 and 622) for local IP offload.

Referring to FIGS. 7-10, example methodologies relating to utilizing local IP offload in a wireless network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 7:
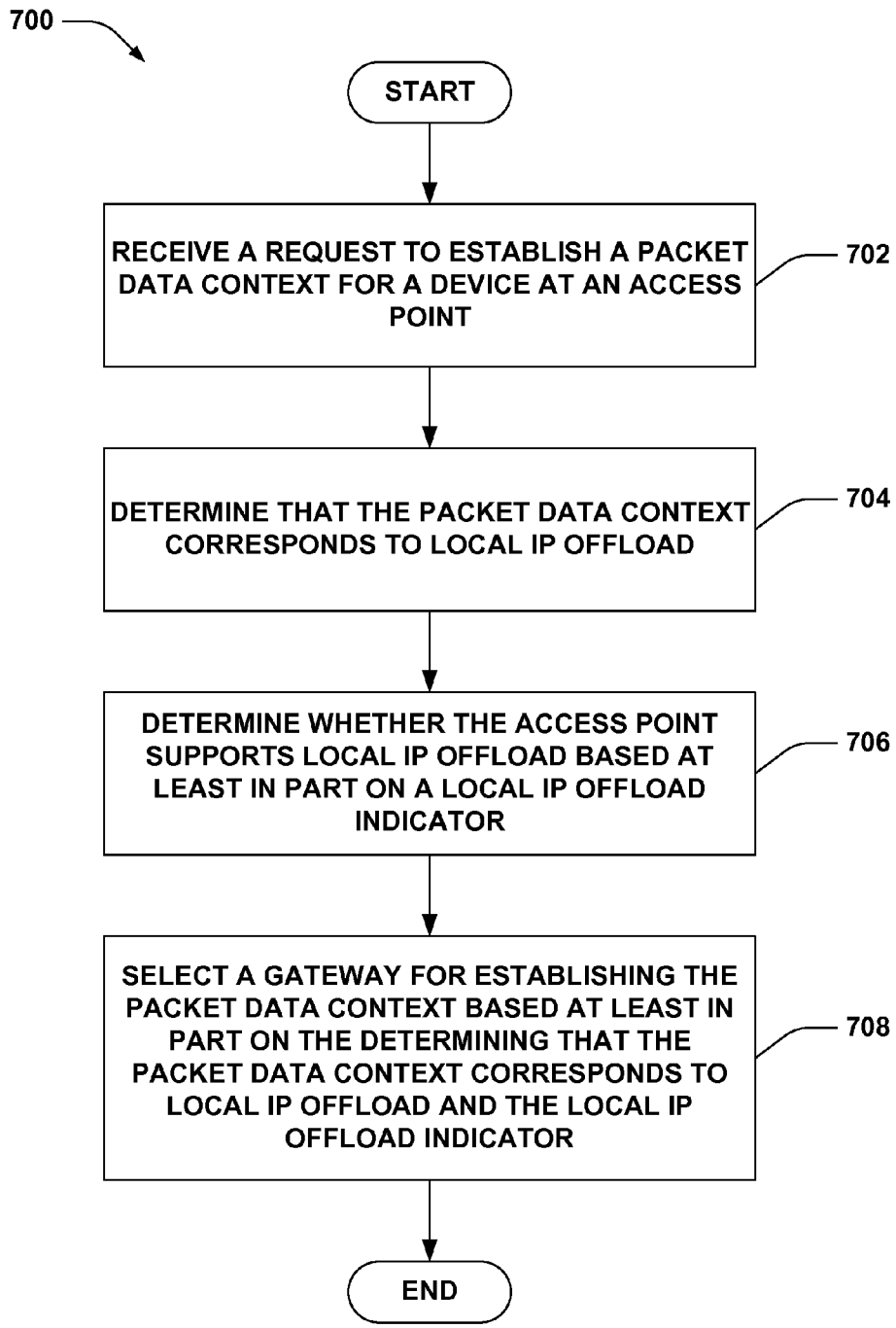
FIG. 7 is a flow chart of an aspect of an example methodology for establishing a packet data context for a device.

Referring to FIG. 7, an example methodology 700 is displayed that facilitates establishing a packet data context for providing local IP offload. At 702, a request to establish a packet data context can be received for a device at an access point. For example, the request can relate to establishing a PDN connection, PDP context, etc., as described. At 704, it can be determined that the packet data context corresponds to local IP offload. For example, the request can include an APN for which the packet data context is requested. Subscription data for the device can be requested and received, for example, and the APN can be located in the subscription data. For example, the subscription data can include a permission that specifies whether the APN relates to local IP offload, and thus, as described, the determination can be made based at least in part on the subscription data related to the APN. In one example, the permission can specify whether the APN can use SIPTO, whether the APN is LIPA conditional, LIPA only, LIPA rejected, and/or the like. In another example, the APN can be present in a list of APNs that relate to local IP offload in the subscription data for the device. As described, the subscription data can be received from an HSS or similar subscription node.

At 706, it can be determined whether the access point supports local IP offload based at least in part on a local IP offload indicator. As described, the local IP offload indicator can be received from the access point (e.g., as part of the request for the packet data context forwarded for the device or otherwise). In an example, the local IP offload indicator can be an IP address of a gateway. Thus, based at least in part on receiving an address of the gateway (e.g., in the request for packet data context), it can be determined that the access point supports local IP offload. In this regard, at 708, a gateway can be selected for establishing the packet data context based at least in part on the determining that the packet data context corresponds to local IP offload and the local IP offload indicator. Where the access point supports local IP offload, for example, and indicates a gateway in the request, the indicated gateway can be utilized for establishing the packet data context, as described. Where the access point does not support local IP offload and/or the packet data context does not correspond to local IP offload, for example, a gateway can be selected using DNS or other procedure for selecting a gateway within the mobile network for establishing the packet data context.

Figure 8:
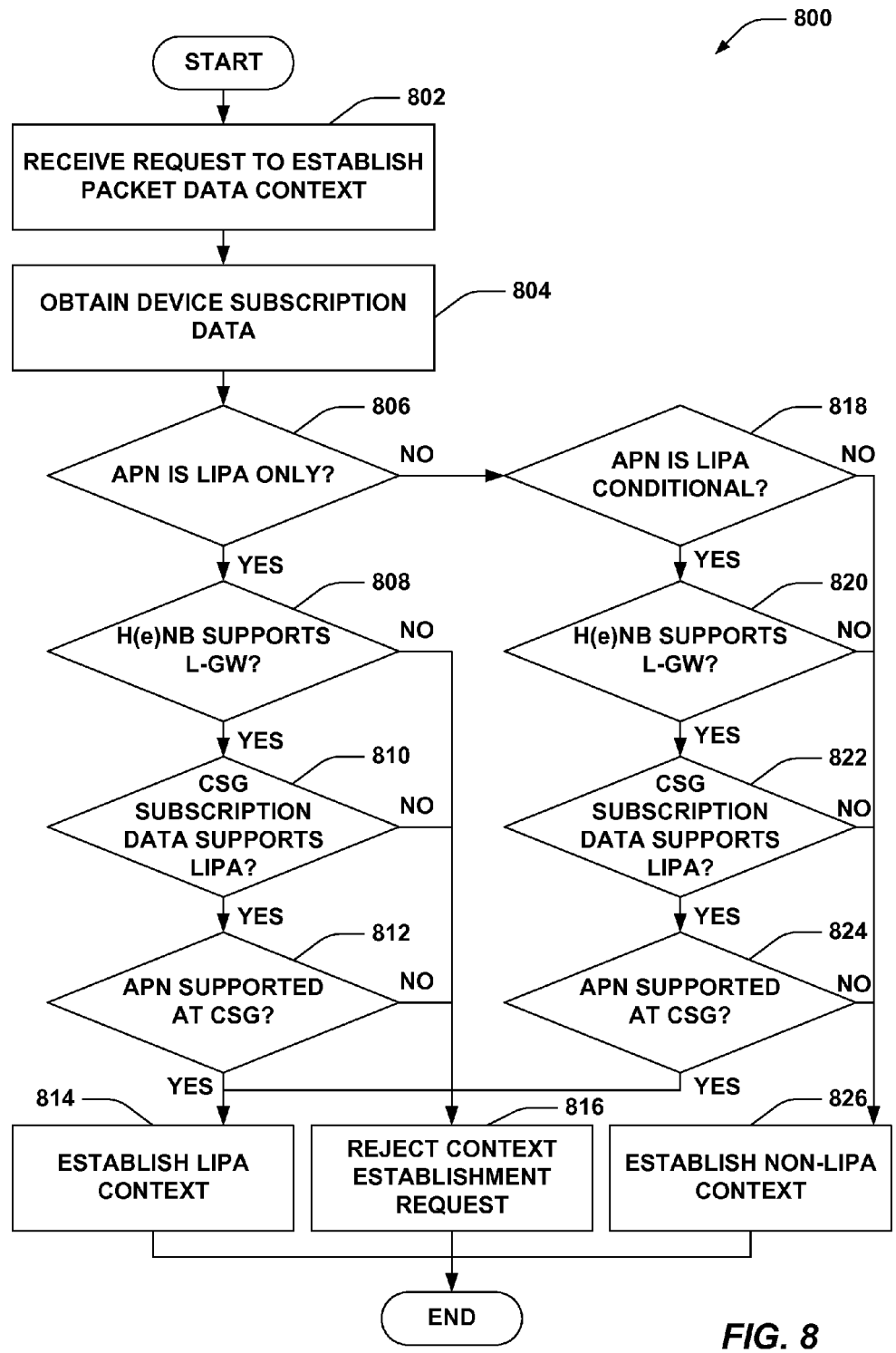
FIG. 8 is a flow chart of an aspect of an example methodology that establishes or rejects establishment of a packet data context.

Turning to FIG. 8, an example methodology 800 is displayed that facilitates determining whether to establish a packet data context for a device. At 802, a request to establish a packet data context can be received. As described, this can be received by a device and can relate to local IP offload. At 804, device subscription data can be obtained. It is to be appreciated that this can be performed upon receiving the request, upon initially communicating with the device, etc. At 806, it can be determined whether an APN in the request is LIPA only. For example, the APN can be located in the subscription data and can have a permission that specifies whether the APN relates to LIPA (e.g. whether the APN is LIPA only, LIPA conditional, LIPA rejected, etc.). As described, in another example, the APN can be present in a corresponding list of APNs that are LIPA only, LIPA conditional, or LIPA rejected. If the APN is LIPA only, it can be determined at 808 whether the H(e)NB supports the L-GW. For example, this can include determining whether the H(e)NB includes an address of the L-GW in the request for the packet data context from the device. If so, then at 810, it can be determined whether the CSG subscription data supports LIPA. As described, this can be obtained from CSG subscription information for the related device. If so, then at 812, it can be determined whether the APN is supported at the CSG. If so, then at 814, a LIPA context can be established. If the H(e)NB does not support the L-GW at 808, CSG subscription data does not support LIPA at 810, or the APN is not supported at the CSG at 812, the context establishment request can be rejected at 816.

Similarly, if the APN is not LIPA only at 806, it can be determined whether the APN is LIPA conditional at 818. If so, it can be whether the H(e)NB supports the L-GW at 820. For example, this can include determining whether the H(e)NB includes an address of the L-GW in the request for the packet data context from the device. If so, then at 822, it can be determined whether the CSG subscription data supports LIPA. As described, this can be obtained from CSG subscription information for the related device. If so, then at 824, it can be determined whether the APN is supported at the CSG. If so, then at 814, a LIPA context can be established. If the H(e)NB does not support the L-GW at 820, CSG subscription data does not support LIPA at 822, or the APN is not supported at the CSG at 824, a non-LIPA context can be established at 826. For example, this can include leveraging a gateway in the mobile network, as described.

Figure 9:
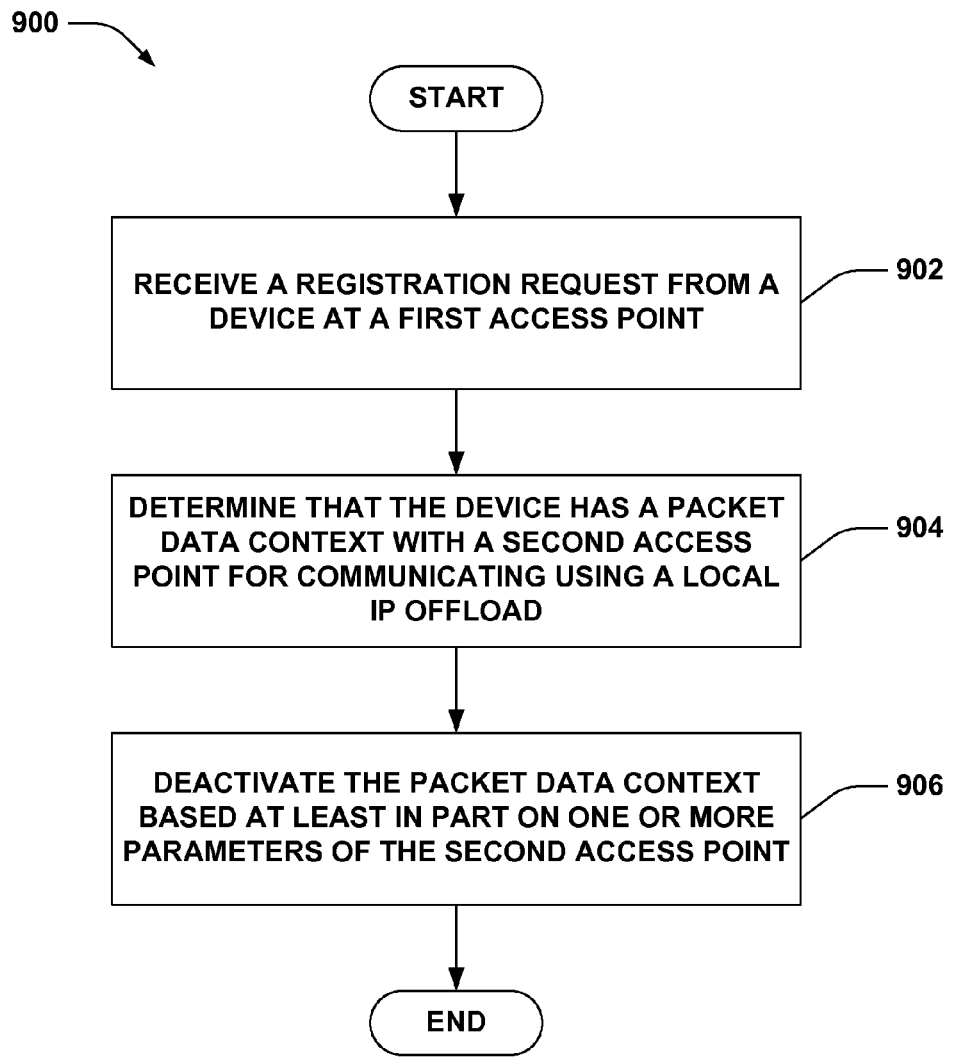
FIG. 9 is a flow chart of an aspect of an example methodology for deactivating a packet data context.

Referring to FIG. 9, an example methodology 900 for deactivating a packet data context is illustrated. At 902, a registration request can be received from a device at a first access point. At 904, it can be determined that the device has a packet data context with a second access point for communicating using a local IP offload. As described, for example, the device can have established the packet data context with the second access point, and can be reselecting the first access point. In this regard, it can be desirable to continue utilizing the packet data context where possible. At 906, however, the packet data context can be deactivated based at least in part on one or more parameters of the second access point. In one example, where the first access point is outside of a range specified for the second access point by a gateway for utilizing local IP offload, the context can be deactivated and reestablished. In other examples, where the first and second access points report different gateways in forwarding requests for packet data contexts, have different global cell identifiers, different CSG identifiers, and/or the like, the packet data context can be deactivated in favor of a new packet data context established through the first access point.

Figure 10:
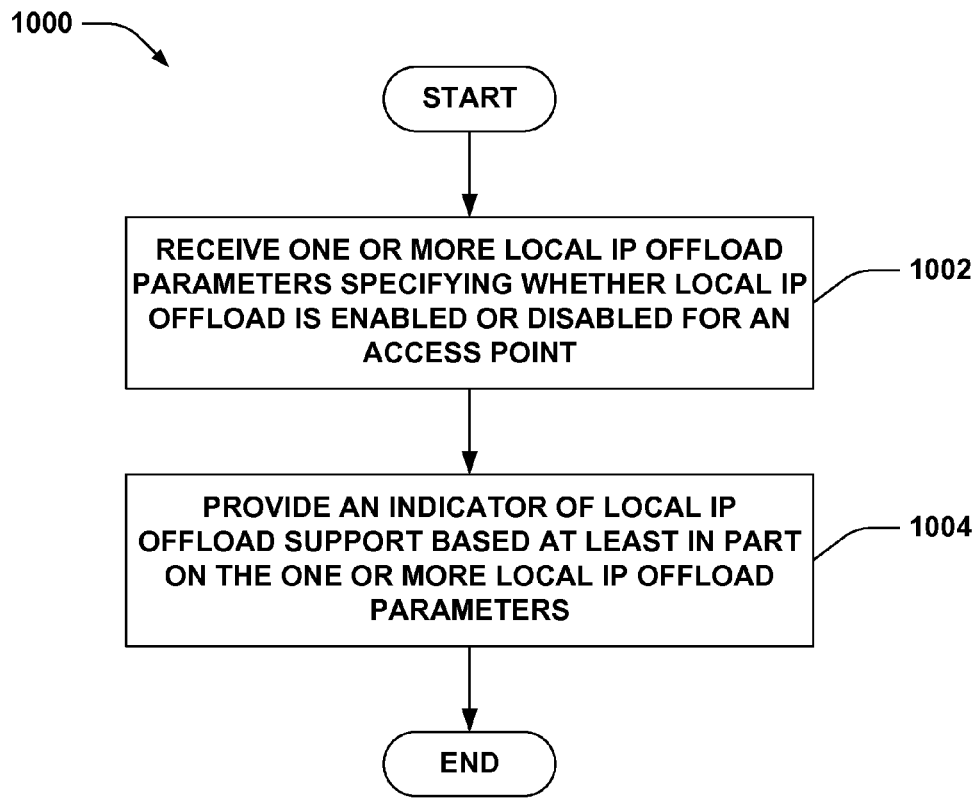
FIG. 10 is a flow chart of an aspect of an example methodology for indicating local IP offload support.

Turning to FIG. 10, an example methodology 1000 is depicted for providing an indicator for local IP offload support. At 1002, one or more local IP offload parameters can be received specifying whether local IP offload is enabled or disabled for an access point. At 1004, an indicator of local IP offload support can be provided based at least in part on the one or more local IP offload parameters. As described, for example, the indicator can be provided as an address of a gateway in a request for packet data context forwarded for a device.

It will be appreciated that, in accordance with one or more aspects described herein, inferences can be made regarding determining whether to establish a packet data context for local IP offload, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
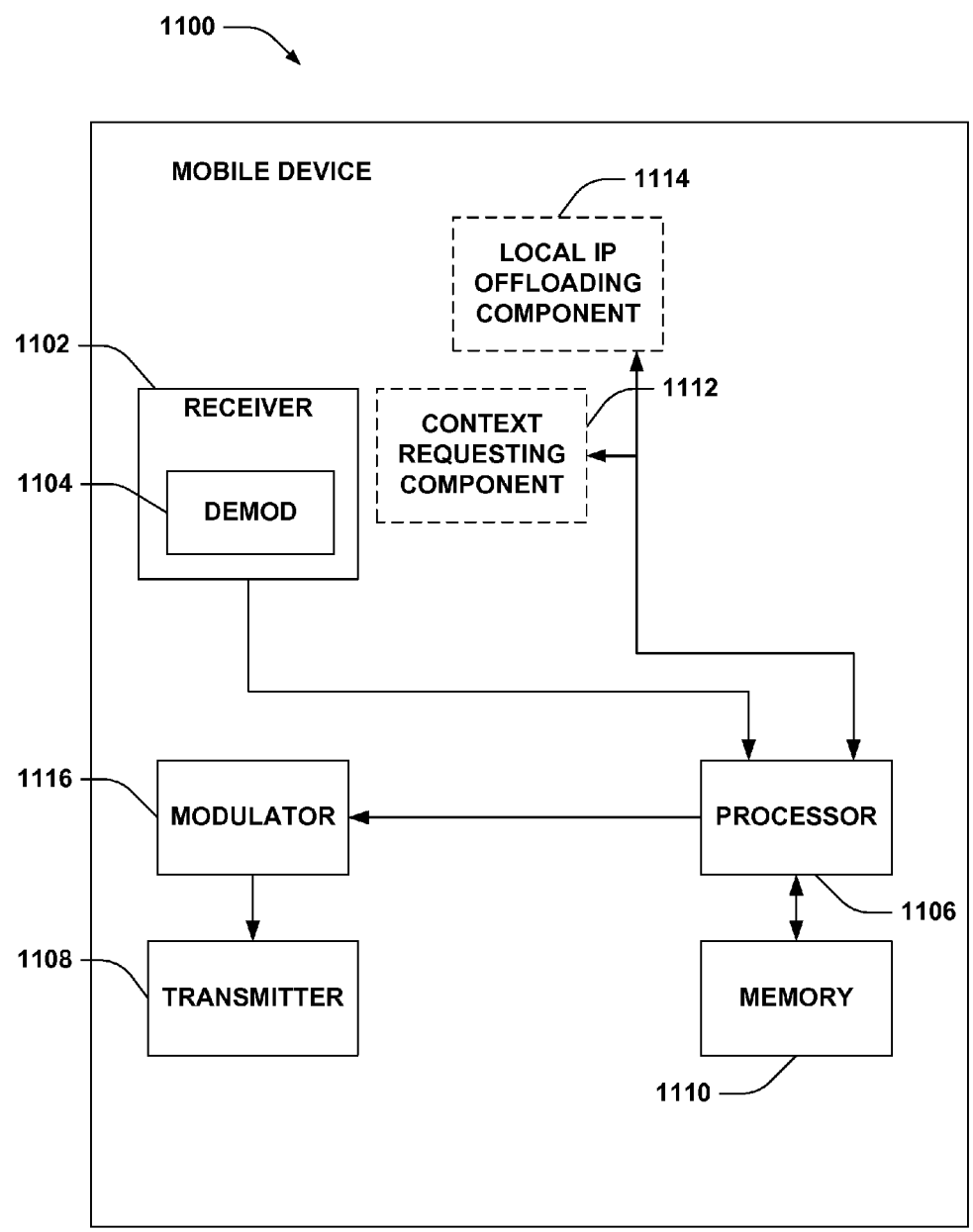
FIG. 11 is a block diagram of an example mobile device for requesting a packet data context for local IP offload.

FIG. 11 is an illustration of a mobile device 1100 that facilitates requesting a packet data context for local IP offload. Mobile device 1100 comprises a receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1108, a processor that controls one or more components of mobile device 1100, and/or a processor that both analyzes information received by receiver 1102, generates information for transmission by transmitter 1108, and controls one or more components of mobile device 1100.

Mobile device 1100 can additionally comprise memory 1110 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1110 can additionally store protocols and/or algorithms associated with estimating and/or utilizing a channel (e.g., performance based, capacity based, etc.).

It will be appreciated that the data store (e.g., memory 1110) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 of the subject systems and methods is intended to comprise, without being limited to, these and any other suitable types of memory.

Processor 1106 can further be optionally operatively coupled to a context requesting component 1112, which can be similar to context requesting component 212, and a local IP offloading component 1114, which can be similar to local IP offloading component 214. Mobile device 1100 still further comprises a modulator 1116 that modulates signals for transmission by transmitter 1108 to, for instance, a base station, another mobile device, etc. Although depicted as being separate from the processor 1106, it is to be appreciated that the contest requesting component 1112, local IP offloading component 1114, demodulator 1104, and/or modulator 1116 can be part of the processor 1106 or multiple processors (not shown), and/or stored as instructions in memory 1110 for execution by processor 1106.

Figure 12:
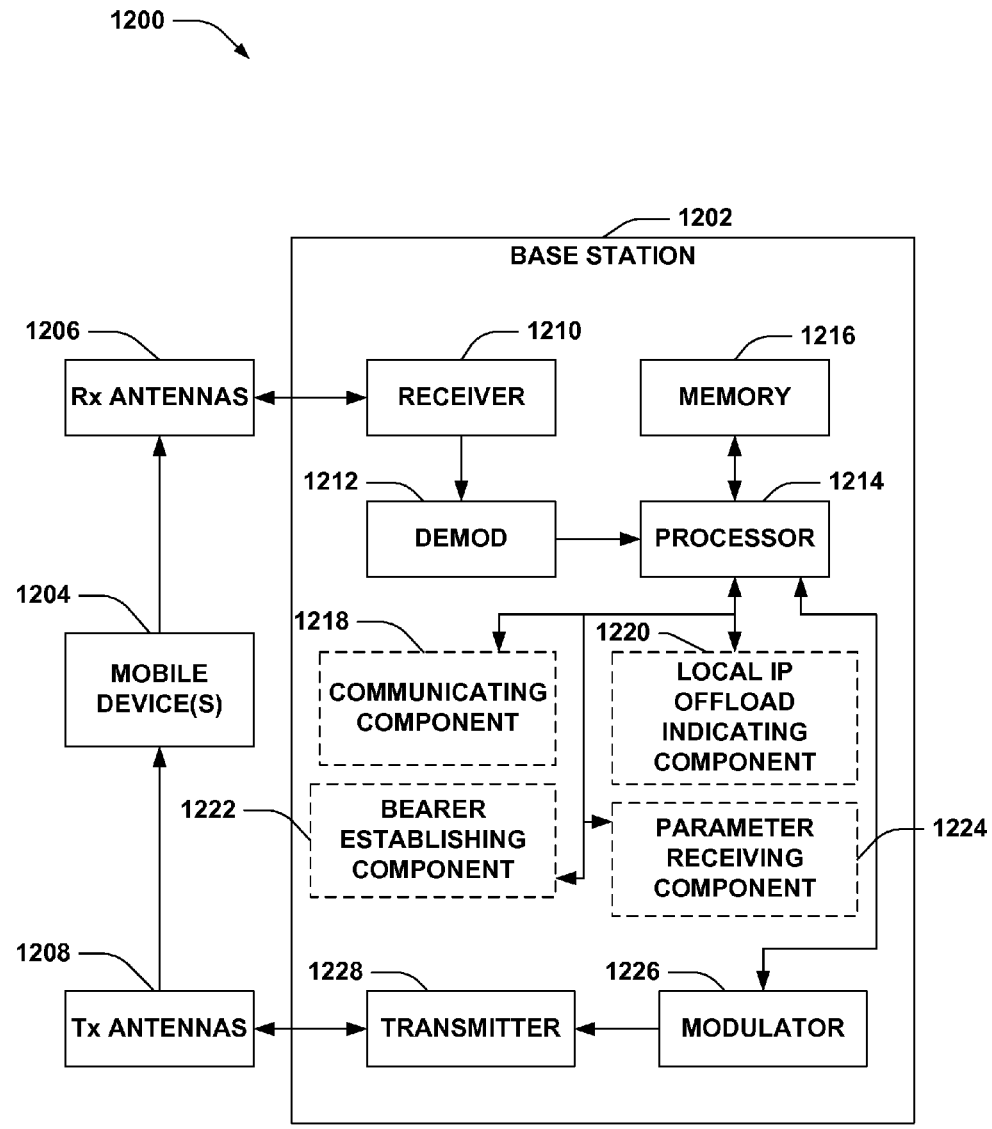
FIG. 12 is a block diagram of an example system for indicating local IP offload support.

FIG. 12 is an illustration of a system 1200 that facilitates communicating with one or more devices using wireless communications. System 1200 comprises a base station 1202, which can be substantially any base station (e.g., a small base station, such as a femtocell, picocell, etc., mobile base station . . . ), a relay, etc., having a receiver 1210 that receives signal(s) from one or more mobile devices 1204 through a plurality of receive antennas 1206 (e.g., which can be of multiple network technologies, as described), and a transmitter 1228 that transmits to the one or more mobile devices 1204 through a plurality of transmit antennas 1208 (e.g., which can be of multiple network technologies, as described). In addition, in one example, transmitter 1228 can transmit to the mobile devices 1204 over a wired front link. Receiver 1210 can receive information from one or more receive antennas 1206 and is operatively associated with a demodulator 1212 that demodulates received information. In addition, in an example, receiver 1210 can receive from a wired backhaul link. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further optionally coupled to a communicating component 1218, which can be similar to communicating component 216, and/or a local IP offload indicating component 1220, which can be similar to local IP offload indicating component 218. In addition, processor 1214 can be optionally coupled to a bearer establishing component 1222, which can be similar to bearer establishing component 220 and/or a parameter receiving component 1224, which can be similar to parameter receiving component 406.

Moreover, for example, processor 1214 can modulate signals to be transmitted using modulator 1226, and transmit modulated signals using transmitter 1228. Transmitter 1228 can transmit signals to mobile devices 1204 over Tx antennas 1208. Furthermore, although depicted as being separate from the processor 1214, it is to be appreciated that the communicating component 1218, local IP offload indicating component 1220, bearer establishing component 1222, parameter receiving component 1224, demodulator 1212, and/or modulator 1226 can be part of the processor 1214 or multiple processors (not shown), and/or stored as instructions in memory 1216 for execution by processor 1214.

Figure 13:
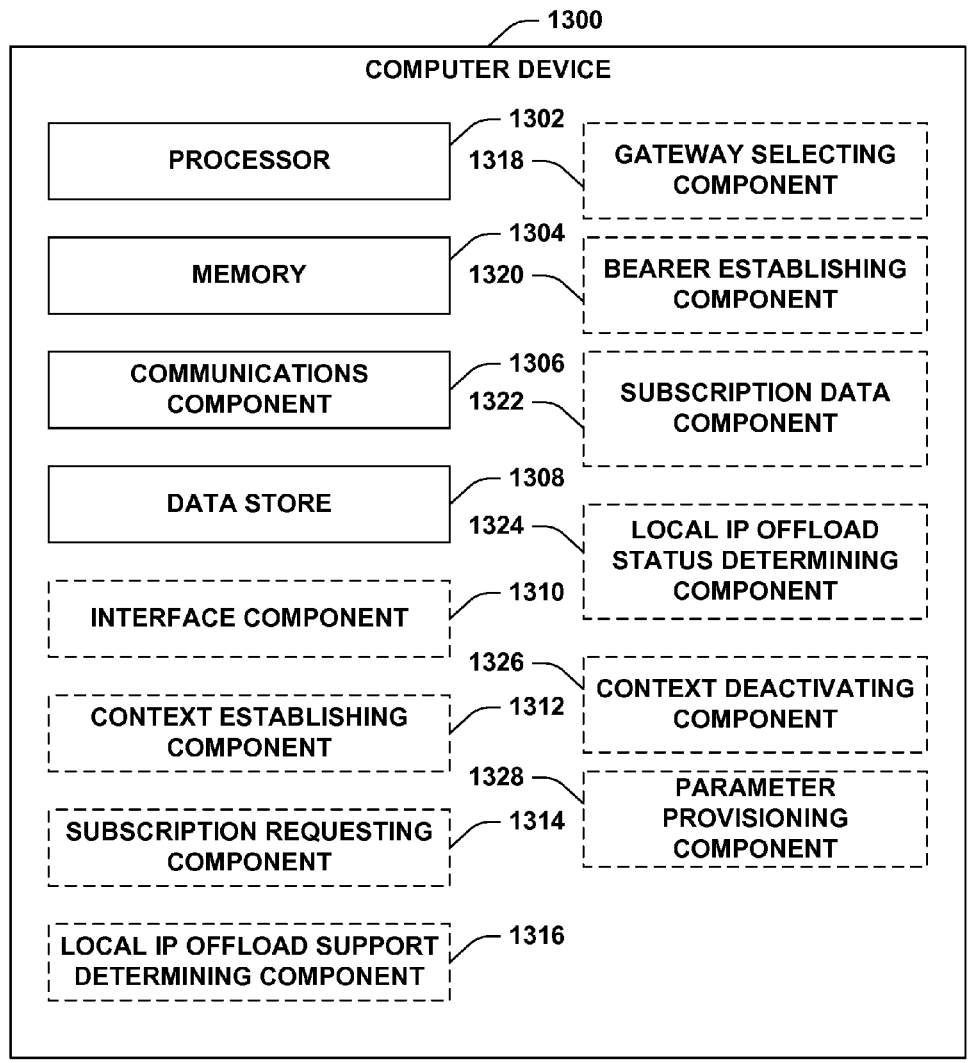
FIG. 13 is a block diagram of an example computing device according to various aspects described herein.

Referring to FIG. 13, in one aspect, any of network nodes 106, gateways 116, 206, or 308, mobility managers 108, 208 or 306, subscription servers 110 or 210, OAM server 404, RNC 504, SGSN 506, GGSN 508, eNB 604, MME 606, S-GW/P-GW 608, etc. (e.g., FIGS. 1-6) can be represented by computer device 1300. Computer device 1300 includes a processor 1302 for carrying out processing functions associated with one or more of components and functions described herein. Processor 1302 can include a single or multiple set of processors or multi-core processors. Moreover, processor 1302 can be implemented as an integrated processing system and/or a distributed processing system.

Computer device 1300 further includes a memory 1304, such as for storing local versions of applications being executed by processor 1302. Memory 1304 can include substantially any type of memory usable by a computer, such as random access memory (RAM), read only memory (ROM), tapes, magnetic discs, optical discs, volatile memory, non-volatile memory, and any combination thereof. Computer device 1300 also includes one or more components 1306-1328, which can be stored in memory 1304, executed by processor 1302 (e.g., based on instructions stored in memory 1304), be implemented within one or more processors 1302, and/or the like.

Further, computer device 1300 includes a communications component 1306 that provides for establishing and maintaining communications with one or more parties utilizing hardware, software, and services as described herein. Communications component 1306 may carry communications between components on computer device 1300, as well as between computer device 1300 and external devices, such as devices located across a communications network and/or devices serially or locally connected to computer device 1300. For example, communications component 1306 may include one or more buses, and may further include transmit chain components and receive chain components associated with a transmitter and receiver, respectively, operable for interfacing with external devices. In one example, communications component 1306 can be similar to communicating components 216 or 222.

Additionally, computer device 1300 may further include a data store 1308, which can be any suitable combination of hardware and/or software, that provides for mass storage of information, databases, and programs employed in connection with aspects described herein. For example, data store 1308 may be a data repository for applications not currently being executed by processor 1302.

Computer device 1300 may optionally include an interface component 1310 operable to receive inputs from a user of computer device 1300, and further operable to generate outputs for presentation to the user. Interface component 1310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 1310 may include one or more output devices, including but not limited to a display, a speaker, a haptic feedback mechanism, a printer, any other mechanism capable of presenting an output to a user, or any combination thereof. In another example, interface component 1310 can be an application programming interface (API) that can be accessed by one or more devices to perform functions on computer device 1300.

In addition, in the depicted example, computer device 1300 can optionally include one or more of context establishing component 1312, which can be similar to context establishing component 224 or 226, a subscription requesting component 1314, which can be similar to subscription requesting component 228, a local IP offload support determining component 1316, which can be similar to local IP offload support determining component 230, a gateway selecting component 1318, which can be similar to gateway selecting component 232, a bearer establishing component 1320, which can be similar to bearer establishing component 234, a subscription data component 1322, which can be similar to subscription data component 236, a local IP offload status determining component 1324, which can be similar to local IP offload status determining component 312, a context deactivating component 1326, which can be similar to context deactivating component 314, and/or a parameter provisioning component 1328, which can be similar to parameter provisioning component 408. Thus, these components 1312, 1314, 1316, 1318, 1320, 1322, 1324, 1326, and/or 1328 can utilize processor 1302 to execute instructions associated therewith, memory 1304 to store information associated therewith, communications component 1306 to carry out communications, and/or the like, as described. In addition, it is to be appreciated that computer device 1300 can include additional or alternative components described herein.

Figure 14:
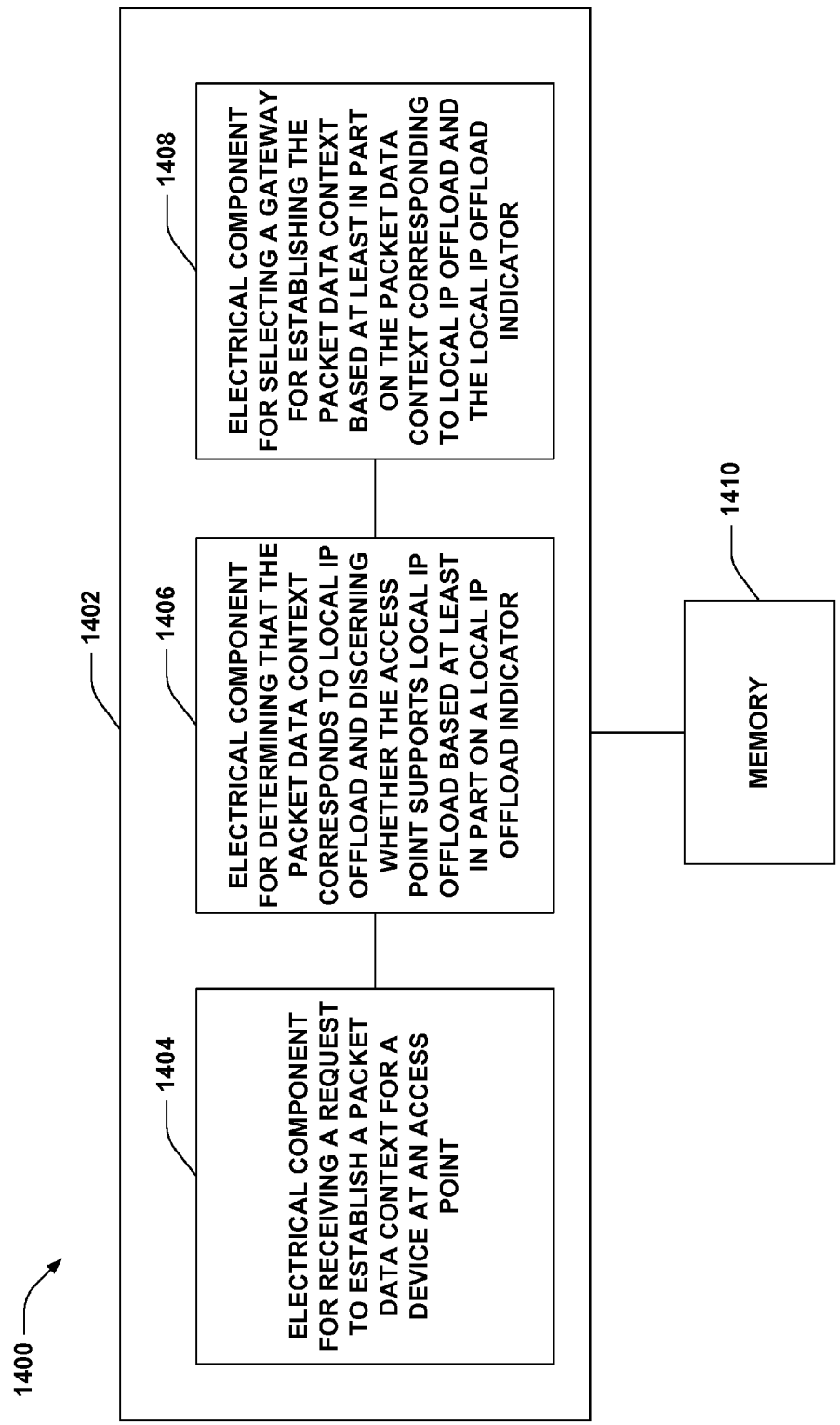
FIG. 14 is a block diagram of an example system that establishes a packet data context for a device.

With reference to FIG. 14, illustrated is a system 1400 that establishes a packet data context for local IP offload. For example, system 1400 can reside at least partially within an MME, SGSN, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a request to establish a packet data context for a device at an access point 1404. As described, this can include a request for a PDN connection or PDP context.

Further, logical grouping 1402 can comprise an electrical component for determining that the packet data context corresponds to local IP offload and discerning whether the access point supports local IP offload based at least in part on a local IP offload indicator 1406. For example, the packet data context can be determined as corresponding the local IP offload based at least in part on an APN in the request for the packet data context. Furthermore, in an example, the local IP offload indicator can be received from the access point as part of the request for the packet data context. In one example, the request can include a specification of a gateway address, which can indicate that the access point supports local IP offload. Moreover, logical grouping 1402 can include an electrical component for selecting a gateway for establishing the packet data context based at least in part on the packet data context corresponding to local IP offload and the local IP offload indicator 1408. As described, where the packet data context corresponds to local IP offload and the access point supports local IP offload, a local gateway can be selected (e.g., a gateway specified by the access point in the request for the packet data context) for provided local IP offload.

For example, electrical component 1404 can include a context establishing component 226, as described above. In addition, for example, electrical component 1406, in an aspect, can include a local IP offload support determining component 230, as described above. Moreover, electrical component 1408 can include a gateway selecting component 232, as described. Additionally, system 1400 can include a memory 1410 that retains instructions for executing functions associated with the electrical components 1404, 1406, and 1408. While shown as being external to memory 1410, it is to be understood that one or more of the electrical components 1404, 1406, and 1408 can exist within memory 1410.

In one example, electrical components 1404, 1406, and 1408 can comprise at least one processor, or each electrical component 1404, 1406, and 1408 can be a corresponding module of at least one processor. Moreover, in an additional or alternative example, electrical components 1404, 1406, and 1408 can be a computer program product comprising a computer readable medium, where each electrical component 1404, 1406, and 1408 can be corresponding code.

Figure 15:
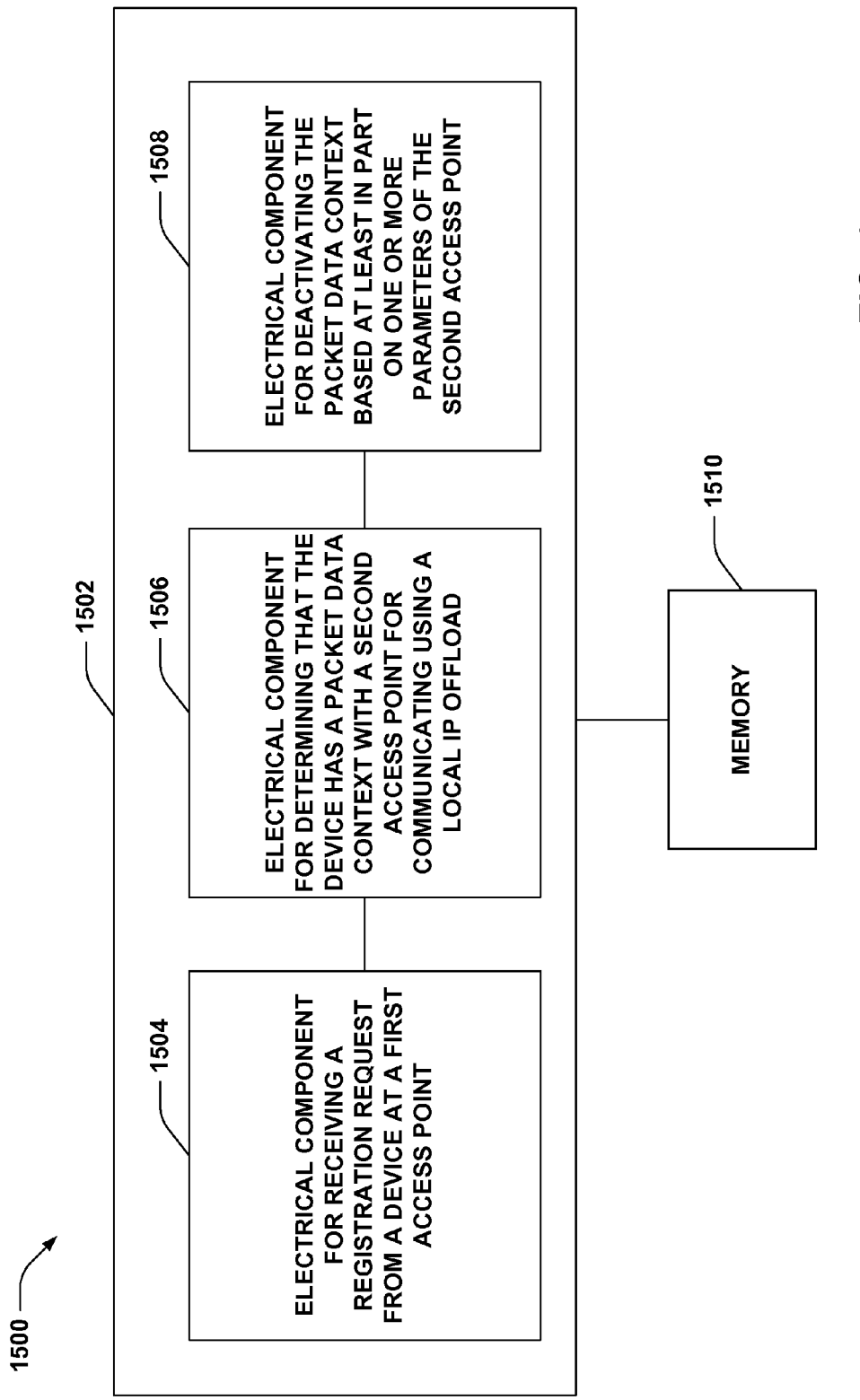
FIG. 15 is a block diagram of an example system that deactivates a packet data context.

With reference to FIG. 15, illustrated is a system 1500 that deactivates a packet data context for local IP offload. For example, system 1500 can reside at least partially within an MME, SGSN, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving a registration request from a device at a first access point 1504. Further, logical grouping 1502 can comprise an electrical component for determining that the device has a packet data context with a second access point for communicating using a local IP offload 1506.

For example, the device can be reselecting to the first access point. Moreover, logical grouping 1502 can include an electrical component for deactivating the packet data context based at least in part on one or more parameters of the second access point 1508. In one example, where the first access point is outside of a range specified for the second access point by a gateway for utilizing local IP offload, electrical component 1508 can deactivate the context. In other examples, where the first and second access points report different gateways in forwarding requests for packet data contexts, have different cell identifiers, different CSG identifiers, and/or the like, electrical component 1508 can deactivate the context in favor of a new packet data context established through the first access point.

For example, electrical component 1504 can include a context establishing component 226, as described above. In addition, for example, electrical component 1506, in an aspect, can include a local IP offload status determining component 312, as described above. Moreover, electrical component 1508 can include a context deactivating component 314, as described. Additionally, system 1500 can include a memory 1510 that retains instructions for executing functions associated with the electrical components 1504, 1506, and 1508. While shown as being external to memory 1510, it is to be understood that one or more of the electrical components 1504, 1506, and 1508 can exist within memory 1510.

In one example, electrical components 1504, 1506, and 1508 can comprise at least one processor, or each electrical component 1504, 1506, and 1508 can be a corresponding module of at least one processor. Moreover, in an additional or alternative example, electrical components 1504, 1506, and 1508 can be a computer program product comprising a computer readable medium, where each electrical component 1504, 1506, and 1508 can be corresponding code.

Figure 16:
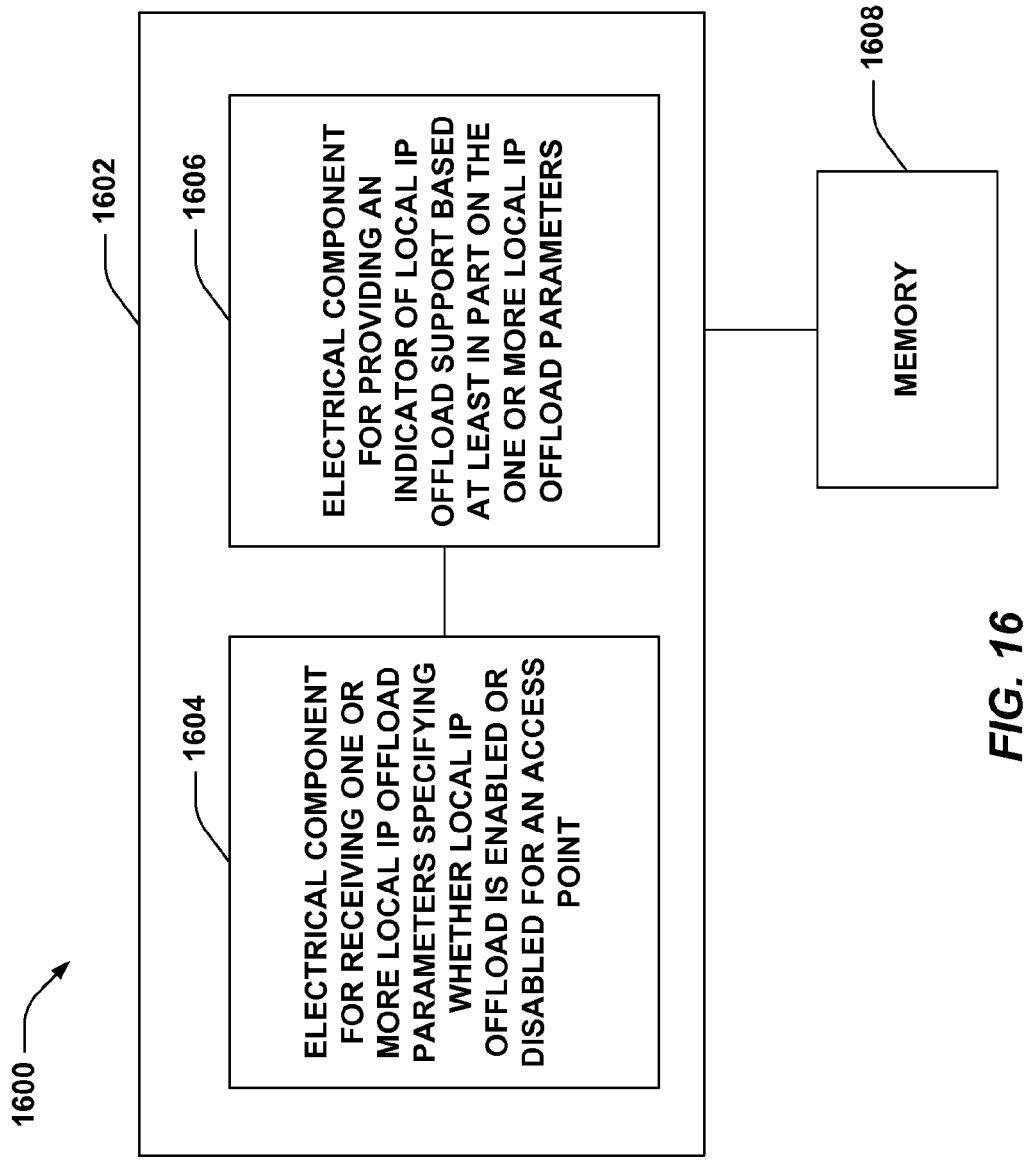
FIG. 16 is a block diagram of an example system that indicates local IP offload support.

With reference to FIG. 16, illustrated is a system 1600 that provides an indicator of local IP offload support. For example, system 1600 can reside at least partially within an access point, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving one or more local IP offload parameters specifying whether local IP offload is enabled or disabled for an access point 1604. For example, this can be received from an OAM server.

Further, logical grouping 1602 can comprise an electrical component for providing an indicator of local IP offload support based at least in part on the one or more local IP offload parameters 1606. As described, for example, the indicator of local IP offload support can include specifying a gateway to utilize for providing local IP offload support, and can be sent as part of a packet data context request forwarded from a device. For example, electrical component 1604 can include a parameter receiving component 406, as described above. In addition, for example, electrical component 1606, in an aspect, can include a local IP offload indicating component 218, as described above. Additionally, system 1600 can include a memory 1608 that retains instructions for executing functions associated with the electrical components 1604 and 1606. While shown as being external to memory 1608, it is to be understood that one or more of the electrical components 1604 and 1606 can exist within memory 1608.

In one example, electrical components 1604 and 1606 can comprise at least one processor, or each electrical component 1604 and 1606 can be a corresponding module of at least one processor. Moreover, in an additional or alternative example, electrical components 1604 and 1606 can be a computer program product comprising a computer readable medium, where each electrical component 1604 and 1606 can be corresponding code.

Figure 17:
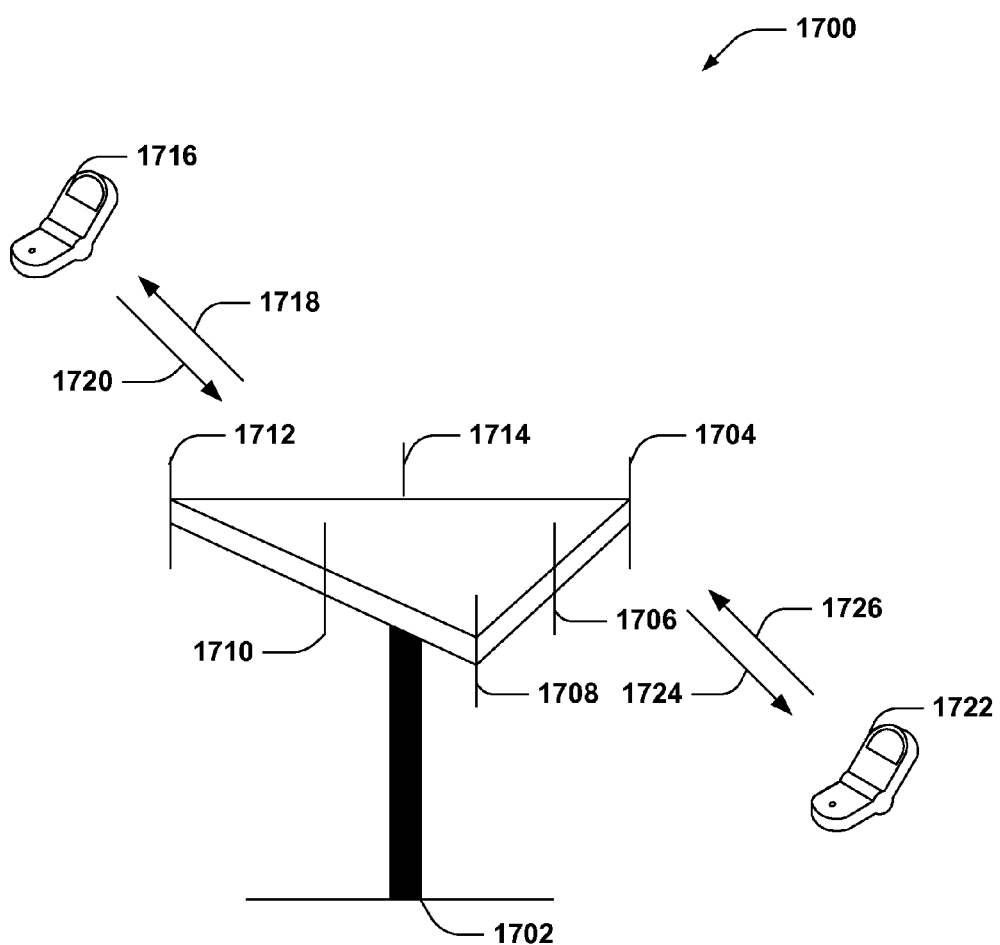
FIG. 17 is a block diagram of an example wireless communication system in accordance with various aspects set forth herein.

Referring now to FIG. 17, a wireless communication system 1700 is illustrated in accordance with various embodiments presented herein. System 1700 comprises a base station 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1702 can communicate with one or more mobile devices such as mobile device 1716 and mobile device 1722; however, it is to be appreciated that base station 1702 can communicate with substantially any number of mobile devices similar to mobile devices 1716 and 1722. Mobile devices 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, mobile device 1716 is in communication with antennas 1712 and 1714, where antennas 1712 and 1714 transmit information to mobile device 1716 over a forward link 1718 and receive information from mobile device 1716 over a reverse link 1720. Moreover, mobile device 1722 is in communication with antennas 1704 and 1706, where antennas 1704 and 1706 transmit information to mobile device 1722 over a forward link 1724 and receive information from mobile device 1722 over a reverse link 1726. In a frequency division duplex (FDD) system, forward link 1718 can utilize a different frequency band than that used by reverse link 1720, and forward link 1724 can employ a different frequency band than that employed by reverse link 1726, for example. Further, in a time division duplex (TDD) system, forward link 1718 and reverse link 1720 can utilize a common frequency band and forward link 1724 and reverse link 1726 can utilize a common frequency band.

Each group of antennas and/or the area in which they are designated to communicate can be referred to as a sector of base station 1702. For example, antenna groups can be designed to communicate to mobile devices in a sector of the areas covered by base station 1702. In communication over forward links 1718 and 1724, the transmitting antennas of base station 1702 can utilize beamforming to improve signal-to-noise ratio of forward links 1718 and 1724 for mobile devices 1716 and 1722. Also, while base station 1702 utilizes beamforming to transmit to mobile devices 1716 and 1722 scattered randomly through an associated coverage, mobile devices in neighboring cells can be subject to less interference as compared to a base station transmitting through a single antenna to all its mobile devices. Moreover, mobile devices 1716 and 1722 can communicate directly with one another using a peer-to-peer or ad hoc technology as depicted. According to an example, system 1700 can be a multiple-input multiple-output (MIMO) communication system.

Figure 18:
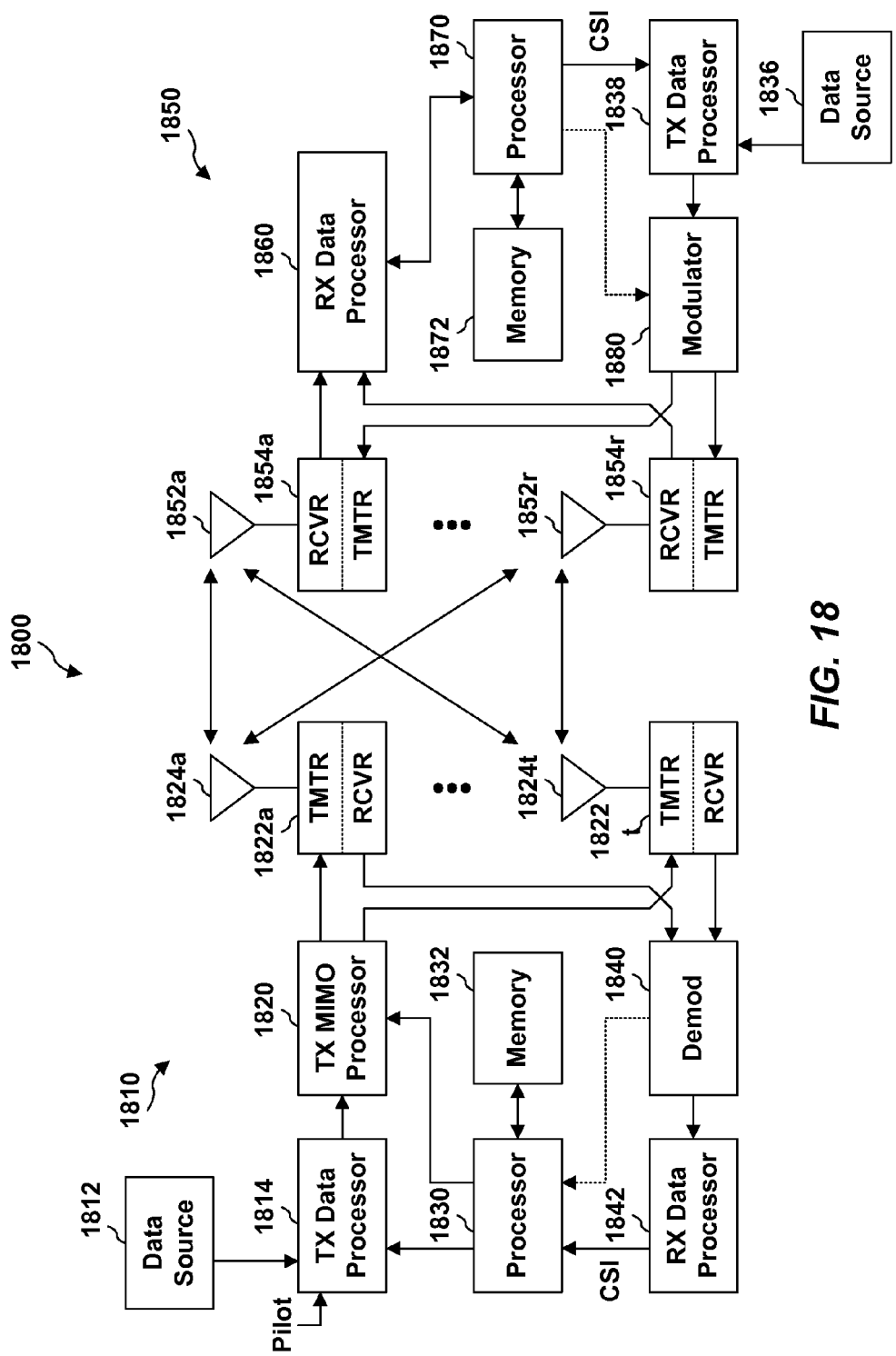
FIG. 18 is an illustration of an example wireless network environment that can be employed in conjunction with the various systems and methods described herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-6, 12, and 14-17), mobile devices (FIG. 11), computer devices, (FIG. 13), and/or methods (FIGS. 7-10) described herein to facilitate wireless communication there between. For example, components or functions of the systems and/or methods described herein can be part of a memory 1832 and/or 1872 or processors 1830 and/or 1870 described below, and/or can be executed by processors 1830 and/or 1870 to perform the disclosed functions.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At mobile device 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

Figure 19:
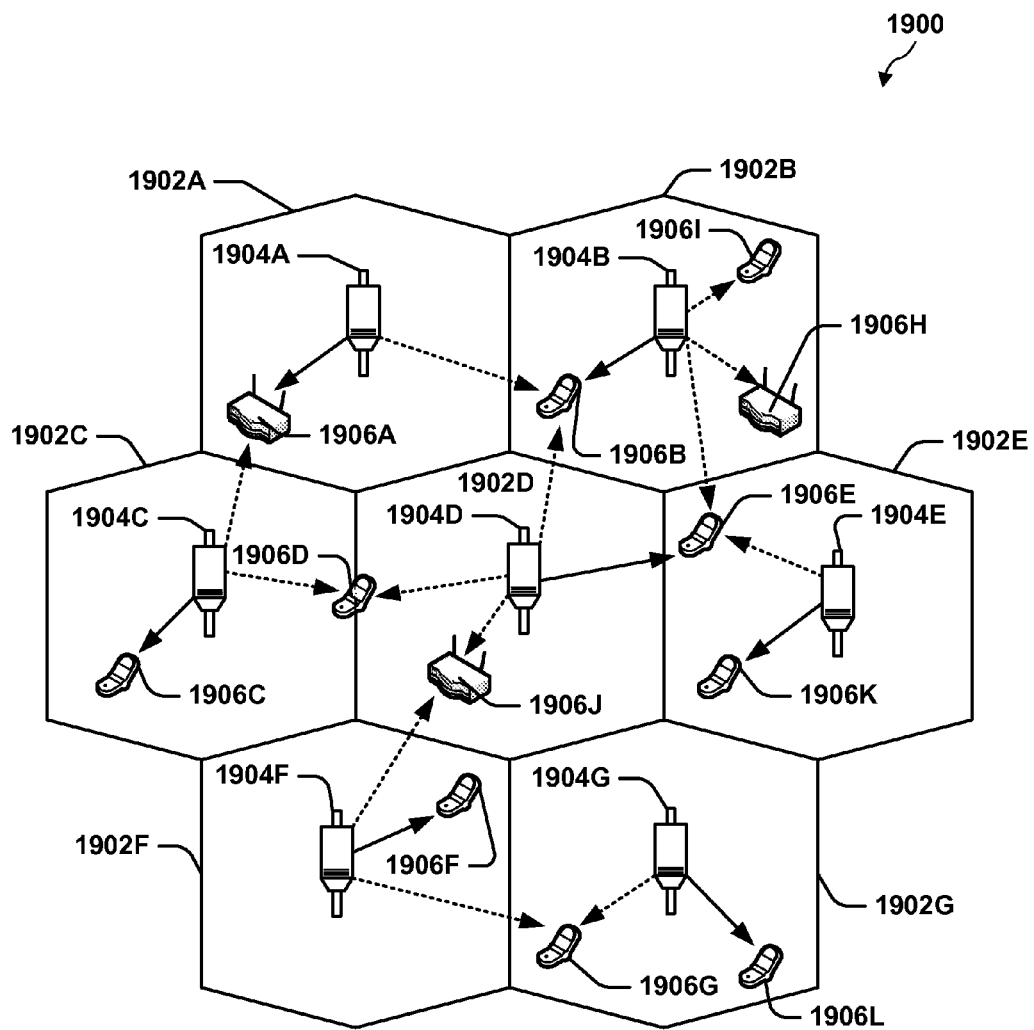
FIG. 19 illustrates an example wireless communication system, configured to support a number of devices, in which the aspects herein can be implemented.

FIG. 19 illustrates a wireless communication system 1900, configured to support a number of users, in which the teachings herein may be implemented. The system 1900 provides communication for multiple cells 1902, such as, for example, macro cells 1902A-1902G, with each cell being serviced by a corresponding access node 1904 (e.g., access nodes 1904A-1904G). As shown in FIG. 19, access terminals 1906 (e.g., access terminals 1906A-1906L) can be dispersed at various locations throughout the system over time. Each access terminal 1906 can communicate with one or more access nodes 1904 on a forward link (FL) and/or a reverse link (RL) at a given moment, depending upon whether the access terminal 1906 is active and whether it is in soft handoff, for example. The wireless communication system 1900 can provide service over a large geographic region.

Figure 20:
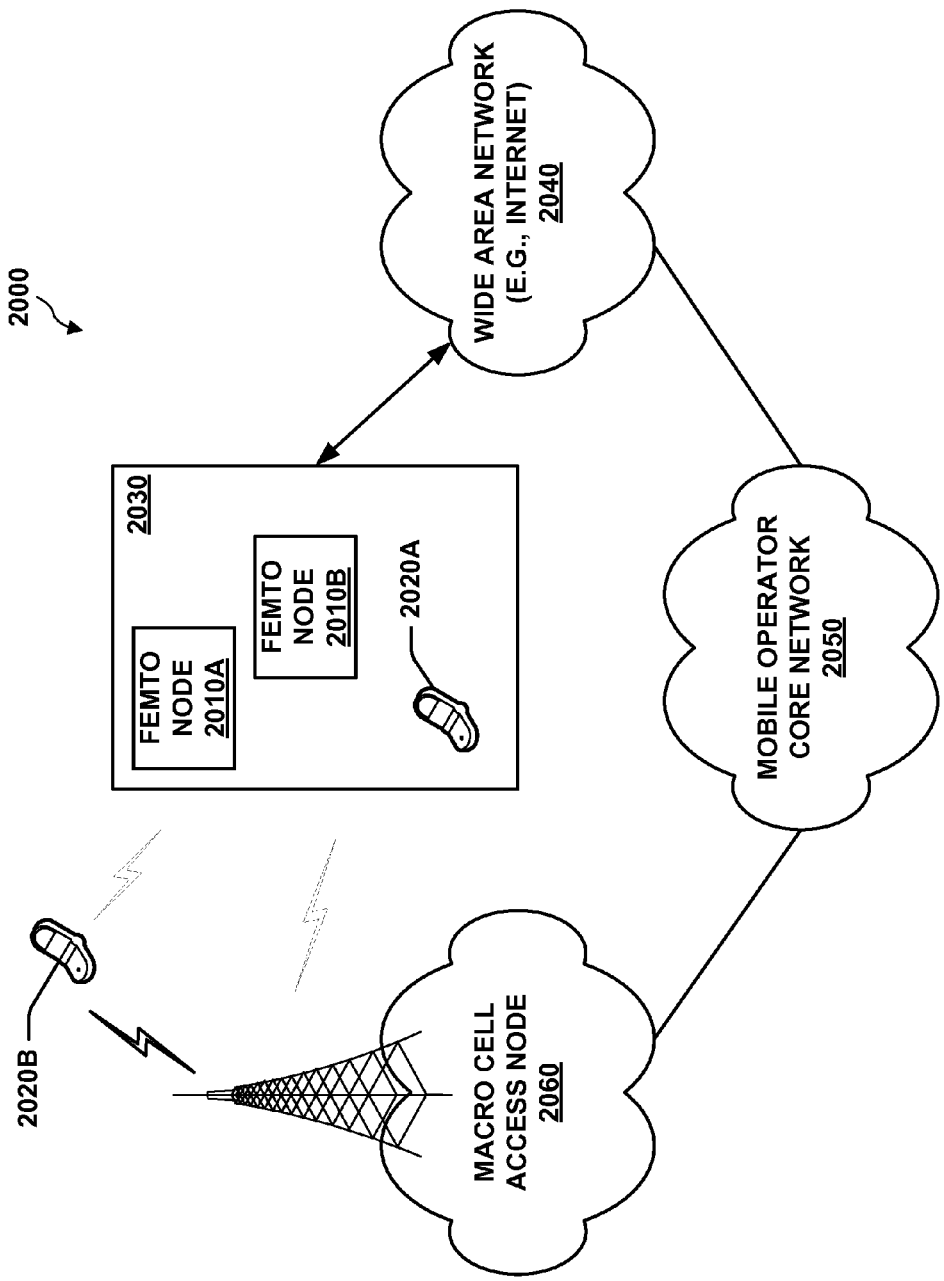
FIG. 20 is an illustration of an exemplary communication system to enable deployment of femtocells within a network environment.

FIG. 20 illustrates an exemplary communication system 2000 where one or more femto nodes are deployed within a network environment. Specifically, the system 2000 includes multiple femto nodes 2010A and 2010B (e.g., femtocell nodes or H(e)NB) installed in a relatively small scale network environment (e.g., in one or more user residences 2030). Each femto node 2010 can be coupled to a wide area network 2040 (e.g., the Internet) and a mobile operator core network 2050 via a digital subscriber line (DSL) router, a cable modem, a wireless link, or other connectivity means (not shown). As will be discussed below, each femto node 2010 can be configured to serve associated access terminals 2020 (e.g., access terminal 2020A) and, optionally, alien access terminals 2020 (e.g., access terminal 2020B). In other words, access to femto nodes 2010 can be restricted such that a given access terminal 2020 can be served by a set of designated (e.g., home) femto node(s) 2010 but may not be served by any non-designated femto nodes 2010 (e.g., a neighbor's femto node).

Figure 21:
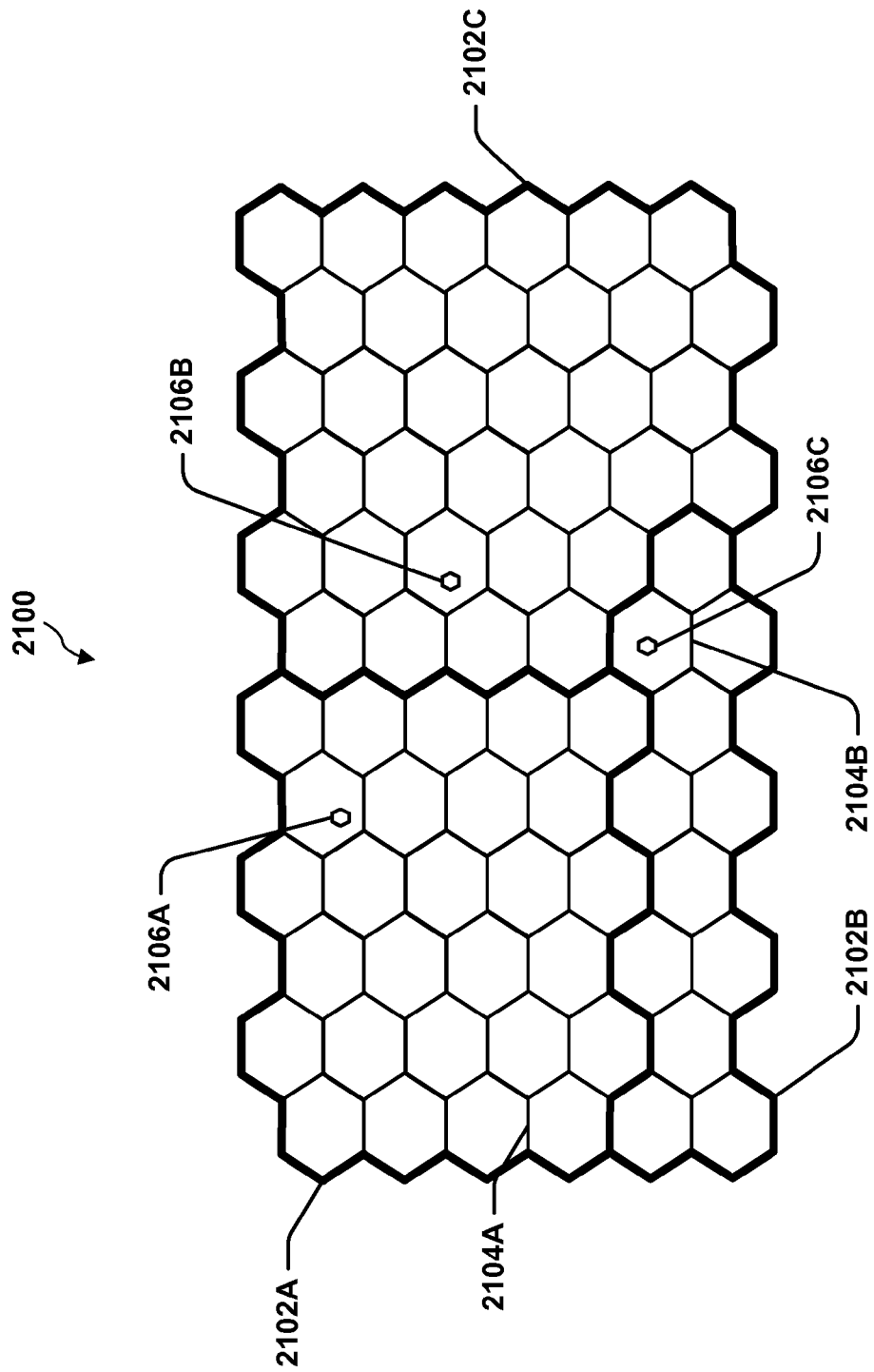
FIG. 21 illustrates an example of a coverage map having several defined tracking areas.

FIG. 21 illustrates an example of a coverage map 2100 where several tracking areas 2102 (or routing areas or location areas) are defined, each of which includes several macro coverage areas 2104. Here, areas of coverage associated with tracking areas 2102A, 2102B, and 2102C are delineated by the wide lines and the macro coverage areas 2104 are represented by the hexagons. The tracking areas 2102 also include femto coverage areas 2106. In this example, each of the femto coverage areas 2106 (e.g., femto coverage area 2106C) is depicted within a macro coverage area 2104 (e.g., macro coverage area 2104B). It should be appreciated, however, that a femto coverage area 2106 may not lie entirely within a macro coverage area 2104. In practice, a large number of femto coverage areas 2106 can be defined with a given tracking area 2102 or macro coverage area 2104. Also, one or more pico coverage areas (not shown) can be defined within a given tracking area 2102 or macro coverage area 2104.

Referring again to FIG. 20, the owner of a femto node 2010 can subscribe to mobile service, such as, for example, 3G mobile service, offered through the mobile operator core network 2050. In addition, an access terminal 2020 can be capable of operating both in macro environments and in smaller scale (e.g., residential) network environments. Thus, for example, depending on the current location of the access terminal 2020, the access terminal 2020 can be served by an access node 2060 or by any one of a set of femto nodes 2010 (e.g., the femto nodes 2010A and 2010B that reside within a corresponding user residence 2030). For example, when a subscriber is outside his home, he is served by a standard macro cell access node (e.g., node 2060) and when the subscriber is at home, he is served by a femto node (e.g., node 2010A). Here, it should be appreciated that a femto node 2010 can be backward compatible with existing access terminals 2020.

A femto node 2010 can be deployed on a single frequency or, in the alternative, on multiple frequencies. Depending on the particular configuration, the single frequency or one or more of the multiple frequencies can overlap with one or more frequencies used by a macro cell access node (e.g., node 2060). In some aspects, an access terminal 2020 can be configured to connect to a preferred femto node (e.g., the home femto node of the access terminal 2020) whenever such connectivity is possible. For example, whenever the access terminal 2020 is within the user's residence 2030, it can communicate with the home femto node 2010.

In some aspects, if the access terminal 2020 operates within the mobile operator core network 2050 but is not residing on its most preferred network (e.g., as defined in a preferred roaming list), the access terminal 2020 can continue to search for the most preferred network (e.g., femto node 2010) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 2020 can limit the search for specific band and channel. For example, the search for the most preferred system can be repeated periodically. Upon discovery of a preferred femto node, such as femto node 2010, the access terminal 2020 selects the femto node 2010 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 2010 that reside within the corresponding user residence 2030). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing local internet protocol (IP) offload in wireless communications, comprising:
   receiving a request to establish a packet data context for a device at an access point;
   determining that the packet data context corresponds to a local IP offload;
   determining whether the access point supports the local IP offload based at least in part on a local IP offload indicator; and
   selecting a gateway for establishing the packet data context based at least in part on the determining that the packet data context corresponds to the local IP offload and the local IP offload indicator received from the access point.

2. The method of claim 1, wherein the receiving the request comprises receiving the request forwarded from the access point, and wherein the local IP offload indicator comprises an IP address for the gateway received in the request forwarded from the access point.

3. The method of claim 1, wherein the determining that the packet data context corresponds to the local IP offload is based at least in part on one or more permissions or indicators received in subscription data for the device.

4. The method of claim 3, wherein the one or more permissions or indicators specify whether the local IP offload is allowed for one or more access point names (APN), and wherein the request includes at least one of the one or more APNs.

5. The method of claim 1, further comprising:
   receiving closed subscriber group (CSG) subscription data for the device; and
   determining whether the device is allowed to use the local IP offload at the access point based at least in part on one or more permissions or indicators in the CSG subscription data, wherein the selecting the gateway is further based at least in part on the determining whether the device is allowed to use the local IP offload at the access point.

6. The method of claim 5, wherein the one or more permissions or indicators specify whether the local IP offload is allowed for an access point name (APN) specified in the request based at least in part on one or more permissions or indicators in the CSG subscription data.

7. The method of claim 6, wherein the one or more permissions or indicators specify that the local IP offload is conditional for the APN, the determining whether the device is allowed to utilize the local IP offload at the access point comprises determining that the device is not allowed to utilize the local IP offload at the access point, and the selecting the gateway is based at least in part on performing a domain name service lookup for the gateway.

8. The method of claim 1, further comprising:
requesting establishment of a radio bearer at the access point for communicating using the local IP offload;
associating the packet data context established at the gateway with the radio bearer; and
communicating one or more parameters regarding the packet data context to the device.

9. An apparatus for providing local internet protocol (IP) offload in wireless communications, comprising:
at least one processor configured to:
obtain a request to establish a packet data context for a device at an access point;
determine that the packet data context corresponds to a local IP offload;
determine whether the access point supports the local IP offload based at least in part on a local IP offload indicator; and
select a gateway for establishing the packet data context based at least in part on the packet data context corresponding to the local IP offload and the local IP offload indicator received from the access point; and
a memory coupled to the at least one processor.

10. The apparatus of claim 9, wherein the local IP offload indicator comprises an IP address for the gateway received in the request forwarded from the access point.

11. The apparatus of claim 9, wherein the at least one processor determines that the packet data context corresponds to the local IP offload based at least in part on one or more indicators or permissions received in subscription data for the device.

12. The apparatus of claim 11, wherein the one or more indicators or permissions specify whether the local IP offload is allowed for one or more access point names (APN), and wherein the request includes at least one of the one or more APNs.

13. The apparatus of claim 9, wherein the at least one processor is further configured to:
receive closed subscriber group (CSG) subscription data for the device; and
determine whether the device is allowed to use the local IP offload at the access point based at least in part on one or more indicators or permissions in the CSG subscription data, wherein the at least one processor selects the gateway further based at least in part on whether the device is allowed to use the local IP offload at the access point.

14. The apparatus of claim 13, wherein the one or more indicators or permissions specify whether the local IP offload is allowed for an access point name (APN) specified in the request based at least in part on one or more indicators or permissions in the CSG subscription data.

15. The apparatus of claim 14, wherein the one or more indicators or permissions specify that the local IP offload is conditional for the APN, and the at least one processor determines that the device is not allowed to utilize the local IP offload at the access point and selects the gateway based at least in part on performing a domain name service lookup for the gateway.

16. The apparatus of claim 9, wherein the at least one processor is further configured to:
request establishment of a radio bearer at the access point for communicating using the local IP offload;
associate the packet data context established at the gateway with the radio bearer; and
communicate one or more parameters regarding the packet data context to the device.

17. An apparatus for providing local internet protocol (IP) offload in wireless communications, comprising:
means for receiving a request to establish a packet data context for a device at an access point;
means for determining that the packet data context corresponds to a local IP offload and discerning whether the access point supports the local IP offload based at least in part on a local IP offload indicator; and
means for selecting a gateway for establishing the packet data context based at least in part on the packet data context corresponding to the local IP offload and the local IP offload indicator received from the access point.

18. The apparatus of claim 17, wherein the local IP offload indicator comprises an IP address for the gateway received in the request forwarded from the access point.

19. The apparatus of claim 17, further comprising means for requesting subscription information for the device, wherein the means for determining determines that the packet data context corresponds to the local IP offload based at least in part on one or more indicators or permissions in the subscription information for the device.

20. The apparatus of claim 19, wherein the one or more indicators or permissions specify whether the local IP offload is allowed for one or more access point names (APN), and wherein the request includes at least one of the one or more APNs.

21. The apparatus of claim 17, further comprising means for receiving closed subscriber group (CSG) subscription data for the device, wherein the means for determining further determines whether the device is allowed to use the local IP offload at the access point based at least in part on one or more indicators or permissions in the CSG subscription data, and wherein the means for selecting selects the gateway further based at least in part on whether the device is allowed to use the local IP offload at the access point.

22. The apparatus of claim 21, wherein the one or more indicators or permissions specify whether the local IP offload is allowed for an access point name (APN) specified in the request based at least in part on one or more indicators or permissions in the CSG subscription data.

23. The apparatus of claim 22, wherein the one or more indicators or permissions specify that the local IP offload is conditional for the APN, the means for determining determines that the device is not allowed to utilize the local IP offload at the access point, and the means for selecting selects the gateway based at least in part on performing a domain name service lookup for the gateway.

24. The apparatus of claim 17, further comprising means for requesting establishment of a radio bearer at the access point for communicating using the local IP offload and associating the packet data context established at the gateway with the radio bearer, wherein the means for receiving further communicates one or more parameters regarding the packet data context to the device.

25. A computer program product for providing local internet protocol (IP) offload in wireless communications, comprising:
a computer-readable medium, comprising:
code for causing at least one computer to obtain a request to establish a packet data context for a device at an access point;
code for causing the at least one computer to determine that the packet data context corresponds to a local IP offload;
code for causing the at least one computer to discern whether the access point supports the local IP offload based at least in part on a local IP offload indicator; and
code for causing the at least one computer to select a gateway for establishing the packet data context based at least in part on the packet data context corresponding to the local IP offload and the local IP offload indicator received from the access point.

26. The computer program product of claim 25, wherein the local IP offload indicator comprises an IP address for the gateway received in the request forwarded from the access point.

27. The computer program product of claim 25, wherein the code for causing the at least one computer to determine determines that the packet data context corresponds to the local IP offload based at least in part on one or more indicators or permissions received in subscription data for the device.

28. The computer program product of claim 27, wherein the one or more indicators or permissions specify whether the local IP offload is allowed for one or more access point names (APN), and wherein the request includes at least one of the one or more APNs.

29. The computer program product of claim 25, wherein the computer-readable medium further comprises:
code for causing the at least one computer to receive closed subscriber group (CSG) subscription data for the device; and
code for causing the at least one computer to determine whether the device is allowed to use the local IP offload at the access point based at least in part on one or more indicators or permissions in the CSG subscription data, wherein the code for causing the at least one computer to select selects the gateway further based at least in part on whether the device is allowed to use the local IP offload at the access point.

30. The computer program product of claim 29, wherein the one or more indicators or permissions specify whether the local IP offload is allowed for an access point name (APN) specified in the request based at least in part on one or more indicators or permissions in the CSG subscription data.

31. The computer program product of claim 30, wherein the one or more indicators or permissions specify that the local IP offload is conditional for the APN, the code for causing the at least one computer to determine determines that the device is not allowed to utilize the local IP offload at the access point, and the code for causing the at least one computer to select selects the gateway based at least in part on performing a domain name service lookup for the gateway.

32. The computer program product of claim 25, wherein the computer-readable medium further comprises:
code for causing the at least one computer to request establishment of a radio bearer at the access point for communicating using the local IP offload;
code for causing the at least one computer to associate the packet data context established at the gateway with the radio bearer; and
code for causing the at least one computer to communicate one or more parameters regarding the packet data context to the device.

33. An apparatus for providing local internet protocol (IP) offload in wireless communications, comprising:
a context establishing component for receiving a request to establish a packet data context for a device at an access point;
a local IP offload support determining component for determining that the packet data context corresponds to a local IP offload and discerning whether the access point supports the local IP offload based at least in part on a local IP offload indicator; and
a gateway selecting component for selecting a gateway for establishing the packet data context based at least in part on the packet data context corresponding to the local IP offload and the local IP offload indicator received from the access point.

34. The apparatus of claim 33, wherein the local IP offload indicator comprises an IP address for the gateway received in the request forwarded from the access point.

35. The apparatus of claim 33, further comprising a subscription requesting component for requesting subscription data for the device, wherein the local IP offload support determining component determines that the packet data context corresponds to the local IP offload based at least in part on one or more indicators or permissions in the subscription data for the device.

36. The apparatus of claim 35, wherein the one or more indicators or permissions specify whether the local IP offload is allowed for one or more access point names (APN), and wherein the request includes at least one of the one or more APNs.

37. The apparatus of claim 33, further comprising a subscription requesting component for receiving closed subscriber group (CSG) subscription data for the device, wherein the local IP offload support determining component further determines whether the device is allowed to use the local IP offload at the access point based at least in part on one or more indicators or permissions in the CSG subscription data, and wherein the gateway selecting component selects the gateway further based at least in part on whether the device is allowed to use the local IP offload at the access point.

38. The apparatus of claim 37, wherein the one or more indicators or permissions specify whether the local IP offload is allowed for an access point name (APN) specified in the request based at least in part on one or more indicators or permissions in the CSG subscription data.

39. The apparatus of claim 38, wherein the one or more indicators or permissions specify that the local IP offload is conditional for the APN, the local IP offload support determining component determines that the device is not allowed to utilize the local IP offload at the access point, and the gateway selecting component selects the gateway based at least in part on performing a domain name service lookup for the gateway.

40. The apparatus of claim 33, further comprising a bearer establishing component for requesting establishment of a radio bearer at the access point for communicating using the local IP offload and associating the packet data context established at the gateway with the radio bearer, wherein the context establishing component further communicates one or more parameters regarding the packet data context to the device.

* * * * *